US011601797B2

(12) United States Patent
Chughtai et al.

(10) Patent No.: US 11,601,797 B2
(45) Date of Patent: *Mar. 7, 2023

(54) METHODS AND SYSTEMS OF USING REMOTE SUBSCRIBER IDENTIFICATION MODULES AT A DEVICE

(71) Applicant: Pismo Labs Technology Limited, Kowloon (HK)

(72) Inventors: Uzair Ahmed Chughtai, Kowloon (HK); Man Kit Kwan, New Territories (HK); Yu Yeung, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,211

(22) Filed: Mar. 28, 2022

(65) Prior Publication Data
US 2022/0225078 A1 Jul. 14, 2022

Related U.S. Application Data

(63) Continuation of application No. 17/039,616, filed on Sep. 30, 2020, now Pat. No. 11,290,867, which is a (Continued)

(51) Int. Cl.
*H04W 8/18* (2009.01)
*H04L 12/46* (2006.01)
(Continued)

(52) U.S. Cl.
CPC ......... *H04W 8/183* (2013.01); *H04L 12/1403* (2013.01); *H04L 12/1464* (2013.01);
(Continued)

(58) Field of Classification Search
CPC ..... H04W 8/205; H04W 12/35; H04W 12/06; H04W 8/183; H04W 4/24; H04W 88/06;
(Continued)

(56) References Cited

U.S. PATENT DOCUMENTS 8,265,662 B1 9/2012 Vargantwar
9,378,359 B2 6/2016 Qureshi
(Continued)

FOREIGN PATENT DOCUMENTS

CN 101480073 A 7/2009
CN 102056341 A 5/2011
(Continued)

OTHER PUBLICATIONS

International Search Report in International Application No. PCT/IB2018/053983, dated Mar. 4, 2019.
(Continued)

*Primary Examiner* — Ajibola A Akinyemi
(74) *Attorney, Agent, or Firm* — FisherBroyles, LLP; James Pohl

(57) ABSTRACT

The present invention discloses methods and systems for communicating at a cellular router between a first wireless communication module and a first subscriber identity module (SIM). The cellular router receives a first request from a first wireless communication module and encapsulates the first request in a first modified request. The cellular router then sends the first modified request to a first SIM card in a first communication apparatus and waits for a first modified reply. While waiting for the first modified reply the cellular router sends at least one halt message to the first wireless communication module after a first time threshold. After receiving the first modified reply, the cellular router decapsulates the first modified reply to retrieve a first reply and sends the first reply to the first wireless communication module where the first modified reply is a reply to the first modified request.

20 Claims, 19 Drawing Sheets

Related U.S. Application Data continuation of application No. 16/034,671, filed on Jul. 13, 2018, now Pat. No. 10,834,572, which is a continuation of application No. 16/069,886, filed as application No. PCT/IB2018/053983 on Jun. 4, 2018, now Pat. No. 11,212,664.

(51) Int. Cl.

| | | |
|---|---|---|
| *H04L 9/40* | (2022.01) | |
| *H04W 8/20* | (2009.01) | |
| *H04W 12/06* | (2021.01) | |
| *H04L 12/14* | (2006.01) | |
| *H04W 88/06* | (2009.01) | |

(52) U.S. Cl.
CPC ...... *H04L 12/4633* (2013.01); *H04L 63/0853* (2013.01); *H04W 8/205* (2013.01); *H04W 12/06* (2013.01); *H04W 88/06* (2013.01)

(58) Field of Classification Search
CPC ..... H04W 12/42; H04W 48/18; H04W 88/02; H04W 4/90; H04W 4/70; H04W 12/04; H04W 12/08; H04W 4/60; H04W 8/18; H04W 8/186; H04W 8/20; H04W 12/71; H04W 12/40; H04W 12/082; H04W 12/126; H04W 4/025; H04W 4/40; H04W 4/50; H04W 60/04; H04W 8/02; H04W 8/22; H04W 8/245; H04W 8/26; H04W 8/30; H04W 12/12; H04W 12/48; H04W 12/63; H04W 4/024; H04L 12/14; H04L 12/1403; H04L 12/1464; H04L 12/4633
USPC ...................................................... 455/558
See application file for complete search history.

(56) References Cited

U.S. PATENT DOCUMENTS

| | | | |
|---|---|---|---|
| 9,529,996 | B2 | 12/2016 | Qureshi |
| 9,553,769 | B2 | 1/2017 | Abraham |
| 9,565,712 | B1 | 2/2017 | Alam |
| 2003/0211840 | A1 | 11/2003 | Castrogiovanni |
| 2007/0184858 | A1 | 8/2007 | Landschaft |
| 2008/0046580 | A1 | 2/2008 | Lafuente |
| 2009/0029736 | A1 | 1/2009 | Kim |
| 2010/0113012 | A1 | 5/2010 | Chiu |
| 2010/0240414 | A1 | 9/2010 | Lotenberg |
| 2010/0332389 | A1 | 12/2010 | Al-Sahli |
| 2011/0117964 | A1 | 5/2011 | Luo |
| 2012/0275445 | A1 | 11/2012 | Karlsson |
| 2012/0298760 | A1 | 11/2012 | Li |
| 2013/0023235 | A1 | 1/2013 | Fan |
| 2013/0114502 | A1 | 5/2013 | Joshi |
| 2013/0127600 | A1 | 5/2013 | Li |
| 2013/0137484 | A1 | 5/2013 | Torres |
| 2013/0322251 | A1 | 12/2013 | Kotecha |
| 2013/0344857 | A1 | 12/2013 | Berionne |
| 2014/0051398 | A1 | 2/2014 | Ben Shlush |
| 2014/0080485 | A1 | 3/2014 | Park |
| 2014/0128082 | A1 | 5/2014 | Chirayil |
| 2015/0078202 | A1 | 3/2015 | Joshi |
| 2015/0230087 | A1 | 8/2015 | Barkan |
| 2015/0245309 | A1 | 8/2015 | Nayak |
| 2015/0296378 | A1* | 10/2015 | Plestid ............... H04W 8/12 455/411 |
| 2015/0312717 | A1 | 10/2015 | Shih |
| 2015/0334761 | A1 | 11/2015 | Liao |
| 2015/0341630 | A1* | 11/2015 | Zheng ............... G09G 3/006 348/189 |
| 2015/0350880 | A1 | 12/2015 | Li |
| 2016/0037329 | A1* | 2/2016 | Chong ............... G09G 3/3291 455/422.1 |
| 2016/0094985 | A1 | 3/2016 | Chong |
| 2016/0149605 | A1 | 5/2016 | Vecera |
| 2018/0014179 | A1 | 1/2018 | Chan |
| 2018/0070390 | A1 | 3/2018 | Pawar |
| 2018/0077152 | A1 | 3/2018 | Lipovkov |
| 2018/0109942 | A1 | 4/2018 | Lipovkov |

FOREIGN PATENT DOCUMENTS

| | | |
|---|---|---|
| CN | 201830468 U | 5/2011 |
| CN | 103609195 A | 2/2014 |
| CN | 105554728 A | 5/2016 |
| CN | 106231655 A | 12/2016 |
| CN | 106605443 A | 4/2017 |
| CN | 106658569 A | 5/2017 |
| EP | 1850607 A2 | 10/2007 |
| GB | 2562126 A | 11/2018 |
| WO | 2016051231 A1 | 4/2016 |

OTHER PUBLICATIONS

Written Opinion of the International Searching Authority in International Application No. PCT/IB2018/053983, dated Mar. 4, 2019.
International Preliminary Report on Patentability in International Application No. PCT/IB2018/053983, dated Dec. 8, 2020.
International Search Report in International Application No. PCT/IB2014/064950, dated Jul. 6, 2015.
Written Opinion of the International Searching Authority in International Application No. PCT/IB2014/064950, dated Jul. 6, 2015.
International Preliminary Report on Patentability in International Application No. PCT/IB2014/064950, dated Apr. 4, 2017.
Examination Reports in GB Application No. GB2017536.0 (dated Nov. 18, 2021, Feb. 16, 2022, and Mar. 11, 2022).
List of cited documents in relation to GB Application No. GB2017536.0 in European Patent Office.
First Office Action and First Search Report in CN Application No. 201880001089.
English Language Abstract of CN101480073A.
English Language Abstract of CN103609195A.
English Language Abstract of WO2016051231A1.
English Language Abstract of CN102056341A.
English Language Abstract of CN201830468U.
English Language Abstract of EP1850607A2.
English Language Abstract of CN105554728A.
English Language Abstract of CN106605443A.
English Language Abstract of GB2562126A.
English Language Abstract of CN106658569A.
English Language Abstract of CN106231655A.

\* cited by examiner

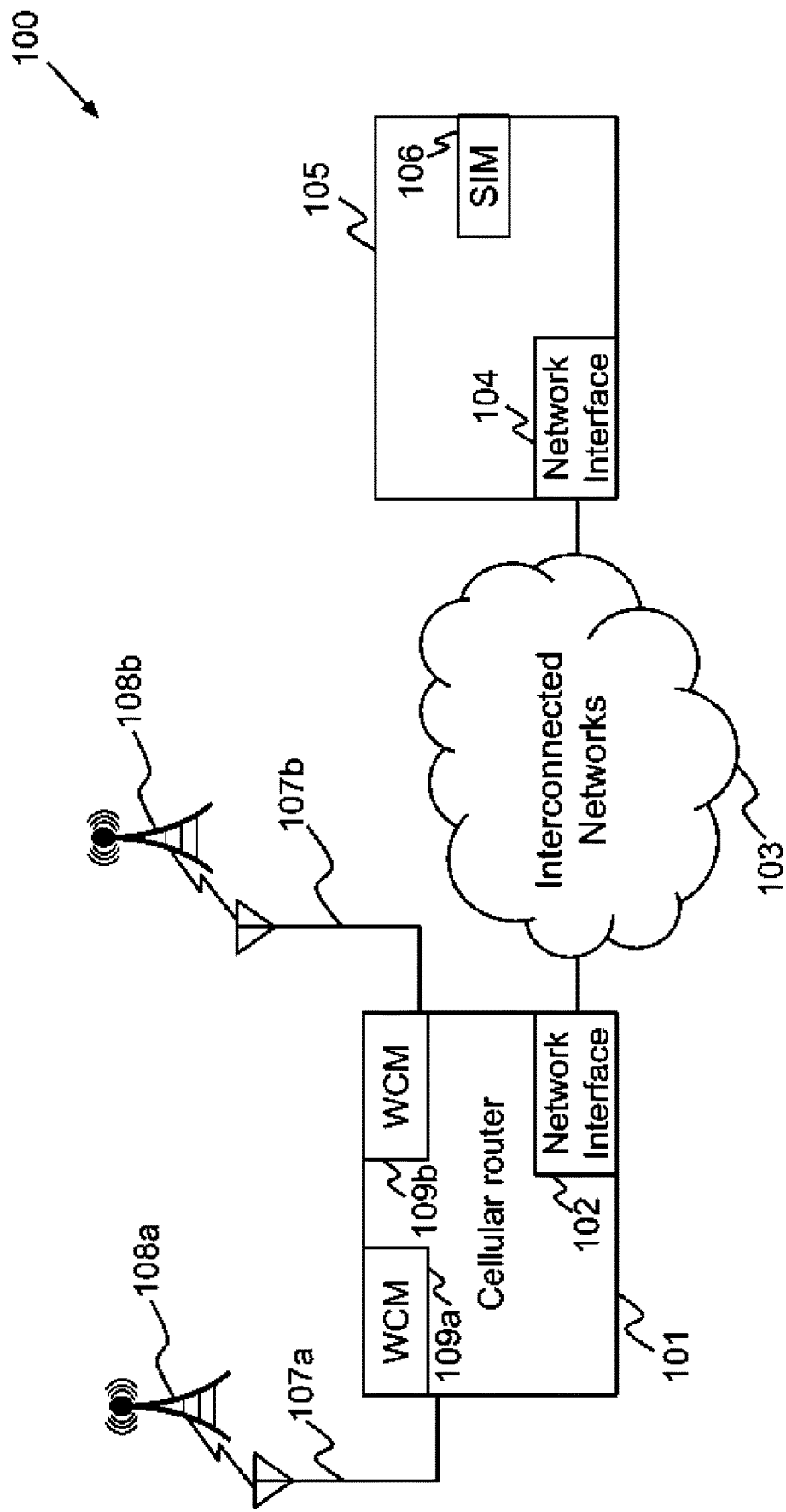

METHODS AND SYSTEMS OF USING REMOTE SUBSCRIBER IDENTIFICATION MODULES AT A DEVICE

RELATED APPLICATIONS

The present application is a continuation application which claims the benefit of and is based on U.S. patent application Ser. No. 17/039,616, titled "METHODS AND SYSTEMS OF USING REMOTE SUBSCRIBER IDENTIFICATION MODULES AT A DEVICE," filed on 30 Sep. 2020, now U.S. Pat. No. 11,290,867, which is a continuation application that claims the benefit of and is based on U.S. patent application Ser. No. 16/034,671, titled "METHODS AND SYSTEMS OF USING REMOTE SUBSCRIBER IDENTIFICATION MODULES AT A DEVICE," filed on 13 Jul. 2018, now U.S. Pat. No. 10,834,572, which is a continuation application which claims the benefit of and is based on U.S. patent application Ser. No. 16/069,886, titled "METHODS AND SYSTEMS OF USING REMOTE SUBSCRIBER IDENTIFICATION MODULES AT A DEVICE," filed on 13 Jul. 2018, now U.S. Pat. No. 11,212,664, which is a National Stage entry of, and claims benefit to, PCT Application No. PCT/IB2018/053983, filed on 4 Jun. 2018, each of which are herein incorporated by reference in their entireties.

TECHNICAL FIELD

The present disclosure relates generally to the field of network communications using subscriber identification module (SIM) cards at an electronic device and more particularly using a plurality of remote SIM cards.

BACKGROUND ART

The ability to allow a device to communicate with other devices, such as web servers, Internet of Things (IoT), self-driving vehicles, and routers, through cellular networks is essential for many activities. The use of subscriber identification module (SIM) cards is essential for transmitting and receiving data through a cellular network. In order to deploy and change SIM cards at such device may demand physical access to the device and SIM cards and impose expensive labour costs. In addition, the logistics involved, such as recoding SIM card usage, choosing the lowest tariff SIM card, and determining when to change SIM card impose additional labour cost. It is desirable to have methods and systems that are able to reduce the labour cost and lower the tariff cost.

SUMMARY OF THE INVENTION

The present invention discloses methods and systems for communicating at a cellular router between a first wireless communication module (WCM) and a first subscriber identity module (SIM). According to the present invention, the cellular router comprises at least one wireless communication module, at least one processing unit, at least one memory; at least one non-transitory computer readable storage medium for storing program instructions executable by the at least one processing unit for receiving a first request from the first wireless communication module. The cellular router then encapsulates the first request in a first modified request and sends the first modified request to a first communication apparatus. After sending the first modified request to the first communication apparatus, the cellular router waits for a first modified reply. While waiting for the first modified reply the cellular router sends at least one halt message to the first wireless communication module after a first time threshold. When the cellular router receives the first modified reply, the cellular router decapsulates the first modified reply to retrieve a first reply and sends the first reply to the first wireless communication module. For the present invention, the first modified reply is a reply to the first modified request. The first wireless communication module is housed inside the cellular router or coupled to the cellular router and the first SIM is not housed in the cellular router.

According to one of the embodiments of the present invention, the first modified request comprises a SIM identification.

According to one of the embodiments of the present invention, the first time threshold is between one hundred milliseconds to two seconds.

According to one of the embodiments of the present invention, when a plurality of halt messages are sent to the first wireless communication module, time interval between two consecutive halt messages is no longer than two seconds.

According to one of the embodiments of the present invention, the at least one halt message is sent only when first request comprises a five bytes header.

According to one of the embodiments of the present invention, a break signal is sent to the first wireless communication module when length of the first request is fewer than five bytes.

According to one of the embodiments of the present invention, the first reply is stored.

According to one of the embodiments of the present invention, the first reply is retrieved and sent to the first wireless communication module when a second request is received and the second request is the same as the first request.

According to one of the embodiments of the present invention, the second modified request is received through aggregated end-to-end connection.

According to one of the embodiments of the present invention, the first modified request is sent through an aggregated end-to-end connection.

BRIEF DESCRIPTION OF DRAWINGS

FIG. 1B illustrates a scenario for a communication system according to one of the embodiments of the present invention.

DETAILED DESCRIPTIONS

Figure 1A:
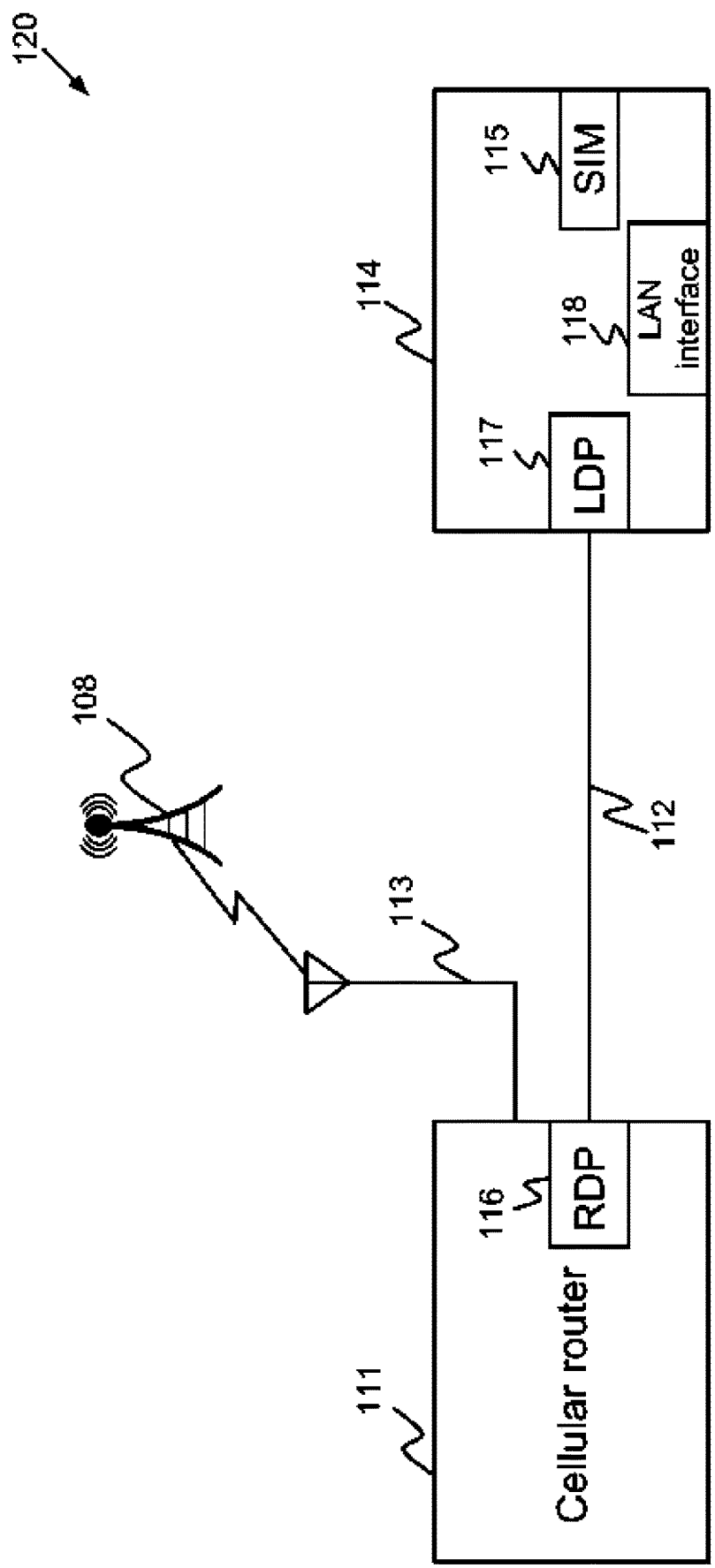
FIG. 1A illustrates a scenario for a communication system according to one of the embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term "non-transitory computer-readable medium", "main memory", or "secondary storage", as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processor/processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller (MCU), a digital signal processor (DSP), any combination of those devices, or any other circuitry configured to process information. A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

A SIM card is a subscriber identification module (SIM). Those who are skilled in the art would appreciate that SIM and SIM card may be used interchangeably when referring to a physical SIM. It is also common to SIM as subscriber identity module.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, a cellular modem, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, a cellular modem, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

FIG. 1A illustrates a scenario for a communication system according to one of the embodiments of the present invention. Communication system 120 comprises communication apparatus 114 connected to cellular router 111 via connection 112. A cellular router may be a cellular router with cellular connectivity capability.

Cellular router 111 and communication apparatus 114 further comprises microcontroller units (MCUs) and other related circuitries not illustrated herein in FIG. 1A for simplicity.

Communication apparatus 114 and cellular router 111 are connected by connection 112. Connection 112 is used to transmit data including SIM card information between communication apparatus 114 and cellular router 111. One end of connection 112 is connected to cellular router 111 and the other end of connection 112 is connected to communication apparatus 114. LDP 117 can perform as a WAN interface for communication apparatus 114 and is used for sending and receiving data including SIM card information. RDP 116 is used for sending and receiving data including SIM card information and can perform as a LAN interface for cellular router 111.

Connection 112 may be comprised of one or more wires, such as a CAT-5 cable and power may be injected into the CAT-5 cable following the Power over Ethernet (PoE) standards. Cellular router 111 may draw power through connection 112 from communication apparatus 114 using PoE techniques.

In one variant, cellular router 111 provides power through connection 112 to communication apparatus 114 also using PoE techniques. There is no limitation a cable must be used to connect communication apparatus 114 and cellular router 111. Wireless communication technologies such as WiFi and infrared communication can be used to replace connection 112.

Antenna 113 is connected to cellular router 111 to transmit and receive electrical signal to and from base station 108. Cellular router 111 is capable of using antenna 113 to communicate wirelessly.

When there is a SIM card inserted into SIM socket 115, SIM card information of the SIM card is transmitted to or received from cellular router 111. By using the SIM card information, cellular router 111 is able to connect to a wireless network. There is no limitation in the number of SIM sockets 115 in communication apparatus 114 for the present embodiment. Each of SIM sockets 115 is capable of holding one SIM card. There is no limitation that the SIM cards must be issued by the same wireless service providers. In one example, the SIM cards are issued by five wireless service providers in five different countries. The variety of providers of SIM cards allows cellular router 111 to use different SIM cards according to different needs.

Communication apparatus 114 has LAN interface 118 for connecting to one or more hosts and/or nodes for transmitting and receiving information. For example, hosts and/or nodes form a LAN with communication apparatus 114 via LAN interface 118. Communication apparatus 114 may also perform as an Internet router or gateway for the hosts and/or nodes. The number of LAN interface 118 is not limited to one. For example, communication apparatus 114 may have multiple LAN interfaces 118. LAN interface 118 may be a wired LAN interface, a wireless LAN interface or a combination of wired LAN interfaces and wireless LAN interfaces. For example, LAN interface 118 can be a wired Ethernet interface. In another example, LAN interface 118 can be an IEEE 802.11 based LAN interface.

In one variant, communication apparatus 114 is an Ethernet switch or hub. LDP 117 then becomes a LAN interface. Communication apparatus 114 is capable of connecting to one or more hosts and/or nodes. Cellular router 111 performs as an Internet router or gateway for the hosts and nodes connected to communication apparatus 114.

Figure 2A:
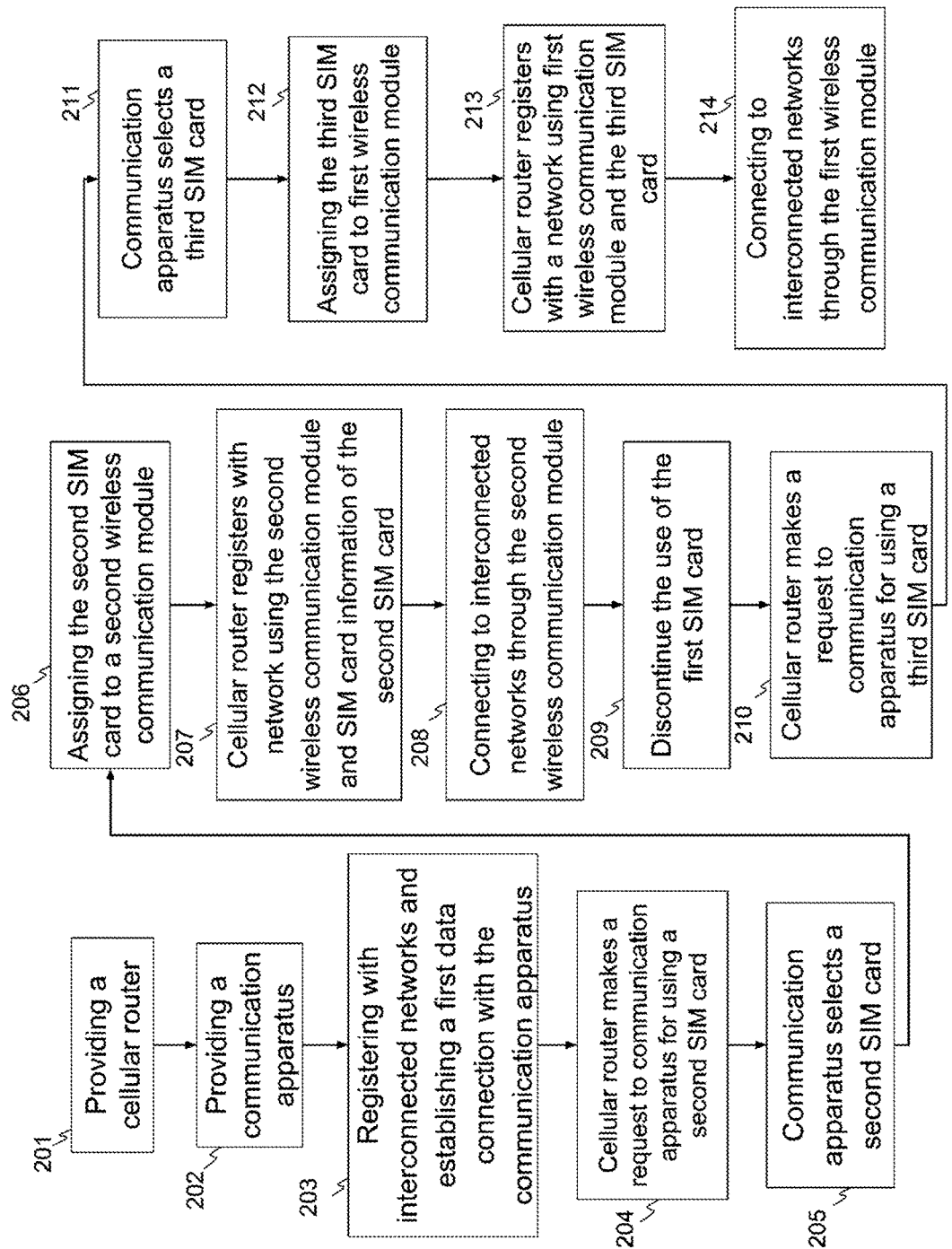
FIG. 2A depicts a flowchart illustrating a process according to the communication system illustrated in FIG. 1B.

FIG. 1B illustrates a scenario for a communication system according to one of the embodiments of the present invention. Communication system 100 comprises cellular router 101 and communication apparatus 105 connected via interconnected networks 103. Cellular router 101 comprises one or more network interfaces 102, a plurality of wireless communication modules 109 and a plurality of antennae 107. Cellular router 101 is connectable to one or more a wireless communication networks or cellular networks associated with base station(s) 108 using wireless communication module(s) 109 and antenna(s) 107. Communication apparatus 105 comprises network interface 104 and SIM socket 106. SIM socket 106 may represent one or a plurality of SIM cards for use in communication apparatus 105. Cellular router 101 and communication apparatus 105 further comprises MCUs, and other related circuitries not illustrated herein in FIG. 1B for simplicity. FIG. 1B should be viewed in conjunction with FIG. 2A. FIG. 2A depicts a flowchart illustrating a process according to communication system 100 illustrated in FIG. 1B.

In steps 201 and 202, cellular router 101 and communication apparatus 105 are provided respectively.

In step 203, cellular router 101 is allowed to register with interconnected networks 103 using wireless communication module 109a embedded in cellular router 101 and a first SIM card plugged into a SIM socket of cellular router 101. The first SIM card plugged into a SIM socket of cellular router 101 are not illustrated herein FIG. 1B for simplicity. Interconnected networks 103 can be a foreign locally accessible cellular network or an interconnection of cellular networks. A foreign locally accessible network is a home network associated with the local SIM cards in the overseas region. The home network is accessible by international SIM cards but with roaming charges. The roaming charges depend on the destination and type of roaming available there. After cellular router 101 is registered with interconnected networks 103, a first data connection or a first data link is established between cellular router 101 and communication apparatus 105 through wireless communication module 109a. The first data connection or first data link established is preferred to be temporary and may necessitate roaming charges while initiating the connection with communication apparatus 105.

In one variant, cellular router 101 is capable of accessing the Internet through a connection. The first data connection can be established not using a cellular connection, but instead using, for example, a Wi-Fi connection, a wired connection, or by using any other available techniques. Then, cellular router 101 may communicate with communication apparatus 105 via the first data connection. In such case there is no need of using a first SIM card and wireless communication module 109a and to register with interconnected networks 103.

In step 204, cellular router 101 sends a request to communication apparatus 105 for using a second SIM card. The request contains router information and is sent using the first data connection. Upon receiving the request, communication apparatus 105 selects a second SIM card from SIM socket 106 at step 205. The selection of the second SIM card can be based on various factors such as geographical coverage area, connection bandwidth, time, network identity, service provider, usage price and signal quality. It is preferred that the second SIM card can be registered for local benefit of the services provided by interconnected networks 103 such that the use of the second SIM card does not incur roaming charges. Router information may include the identity of cellular router 101, identity of administrator of cellular router 101, cellular networks that can be connected by the wireless communication module 109a, identity of the cellular network that is currently registered by the wireless communication module 109a and location of cellular router 101. Identity of cellular router 101 may include a serial number of cellular router 101. Identity of cellular router 101 may also include one or more MAC addresses assigned to cellular router 101. The location of the cellular router 101 may comprise of GPS coordinates provided by a GPS sensor in cellular router 101 or may be entered by a user of cellular router 101.

The request may also include authentication information. The authentication information is to authenticate the request is sent by a valid user or device. For example, a rogue network host may steal router information and pretend to be cellular router 101 in order to use a SIM card in communication apparatus 105. The use of authentication information will try to reduce the probability of such stealing.

Communication apparatus 105 replies to the request with SIM card information and the identity of the second SIM card. Communication apparatus 105 also reserves the second SIM card for a period-of-time for the use of cellular router 101.

In step 206, cellular router 101 receives the reply from communication apparatus 105. Router MCU of cellular router 101 is then ready for wireless communication module 109b to use the second SIM card. The selected second SIM card is assigned to the wireless communication module 109b. Router MCU in cellular router 101 then initiates the wireless communication module 109b. Wireless communication module 109b will then send out an ATR (Answer To Reset). Upon receiving the ATR, router MCU of cellular router 101 will send the ATR to communication apparatus 105 following the sequences illustrated herein FIG. 6.

In step 207, wireless communication module 109b is then able to register with interconnected networks 103 using part or all of SIM card information associated to the selected second SIM card received from communication apparatus 105.

Generally, a wireless network requires cellular router 101 to authenticate every time an event is initiated or even after a certain time period has elapsed. Thus, cellular router 101 should be in connection with communication apparatus 105 for authentication all along time.

In step 208, cellular router 101 is now able to connect to interconnected networks 103 through the wireless communication module 109b. A second data connection is established between cellular router 101 and communication apparatus 105 using the wireless communication module 109b and the selected second SIM card from SIM socket 106. After the second data connection is established, cellular router 101 maintains connection with communication apparatus using the wireless communication module 109b.

In step 209, the first data connection is discontinued and stop using the first SIM card. As a result, the user of cellular router 101 does not need to incur more roaming cost. The wireless communication module 109a may be reset, restart or stopped. There is no SIM card information, data communication, and SMS message can be transmitted or received from the first SIM card while the first SIM card is not used.

In one variant, wireless communication module 109a to connect to interconnected networks 103 using SIM card information from a third SIM card. The third SIM card is a SIM card, other than the SIM cards already being used in communication apparatus 105 or another SIM card in another communication apparatus. The ability to use wireless communication module 109a with the third SIM card along with wireless communication module 109b is to bond the one or more data connections to form an aggregated data connection. An aggregated data connection is capable of providing more bandwidth than one individual data connection can. The aggregated data connection may be perceived as one data connection by sessions or applications that are using it. In one variant, the aggregated data connection may be considered as one VPN connection. The additional bandwidth and more reliability provide better performance compared to using only wireless communication module 109b alone. Steps 210 to 214 may be skipped when wireless communication module 109a is not used to connect to interconnected networks.

In step 210, similar to step 204 but for the third SIM card, cellular router 101 sends a request containing router information for using a third SIM card from SIM cards plugged into SIM sockets 106. Processes in step 211 are similar to the process in step 205 but for the third SIM card.

In step 212, the selected third SIM card is assigned to wireless communication module 109a. In step 213, cellular router 101 registers with interconnected networks 103 using the selected third SIM card. In step 214, cellular router 101 is now also able to connect to interconnected networks 103 through the wireless communication module 109a.

Figure 3A:
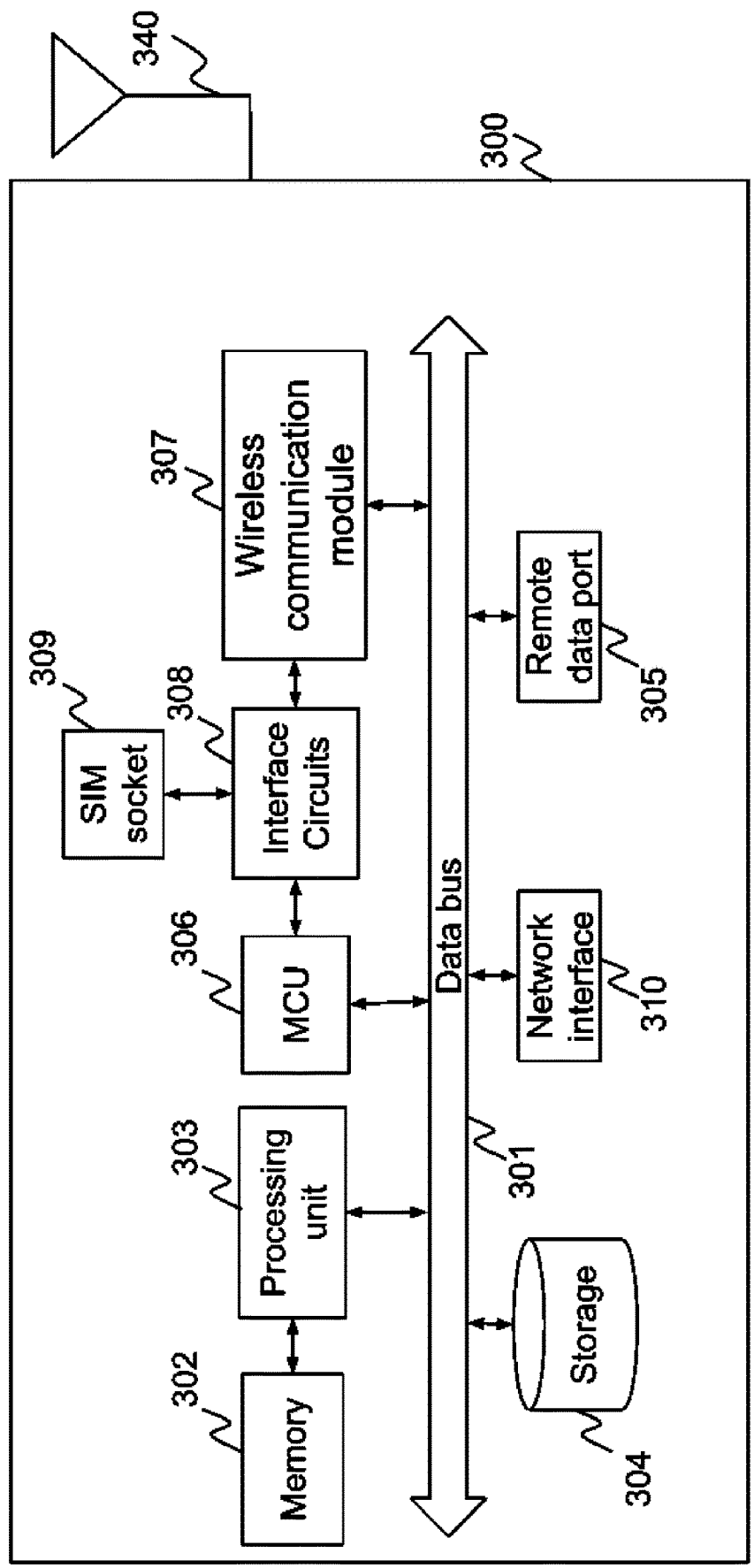
FIG. 3A illustrates a basic block diagram of a cellular router according to one of the embodiments of the present invention.

FIG. 3A illustrates a basic block diagram of an example cellular router according to one of the embodiments of the present invention. Cellular router 300 comprises data bus 301, memory 302, processing unit 303, storage unit 304, remote data port (RDP) 305, MCU 306, wireless communication module 307, interface circuits 308, SIM socket 309 network interface 310 and antenna 340. Processing unit 303 connects directly to memory 302.

Processing unit 303 executes program instructions or code segments for implementing embodiments of the cellular router of the present invention.

Memory 302 and storage unit 304 are non-transitory computer readable storage media. In another embodiment, the storage unit 304 is a non-volatile storage. A non-volatile storage or static storage can be used for storing static information and instructions for processor, as well as various system configuration parameters. Storage unit 304 can be configured to store a firmware. A firmware can be an operating system of cellular router 300.

RDP 305 sends and receives data including SIM card information to and from communication apparatus 320. RDP 305 is also capable of sending and receiving data to and from MCU 306.

MCU 306 receives SIM card information sent from RDP 305 and transmits the SIM card information to wireless communication module 307. MCU 306 is further capable of receiving and transmitting messages, keys from wireless communication module 307 through RDP 305. MCU 306 is also used to encapsulate and retrieve data, including SIM card information sent to and from communication apparatus 320.

Interface circuits 308 comprise of related circuitries such as bus switches and voltage shifters. Bus switches are used for selecting SIM card information received from MCU 306 accordingly and voltage shifters are used to change the voltage from the output of router MCU 306 when required.

Wireless communication module 307 receives SIM card information and then authenticates to a wireless communication network or a cellular network based on the information via antenna 340. Wireless communication modules 307 are also capable of sending messages to MCU 306. There is no limitation to the number of wireless communication modules for the present invention. For example, FIG. 3C illustrates a basic block diagram of an example cellular router 330 identical to cellular router 101 illustrated in FIG. 1B. FIG. 3C is similar to FIG. 3A but cellular router 330 illustrated FIG. 3C further comprises two wireless communication modules 307a-b directly connecting to interface circuits 308a-b and further to antennae 340a-b respectively. Interface circuits 308a-b connect directly to SIM sockets 309a-b and furthermore directly to MCU 306. Wireless communication module 307 could be housed inside or coupled to the cellular router. There is no limitation on the number of wireless communication modules, antennae, SIM sockets and MCU. For example, there may be eight wireless communication modules, thirty-two antennae, sixteen SIM sockets and two MCU. In more details, each MCU is connect to four wireless communication modules; each wireless communication module is connected to two SIM sockets and four antennae.

Data bus 301 connects processing unit 303 directly or indirectly to storage unit 304, RDP 305, MCU 306 and wireless communication module 307.

Figure 3B:
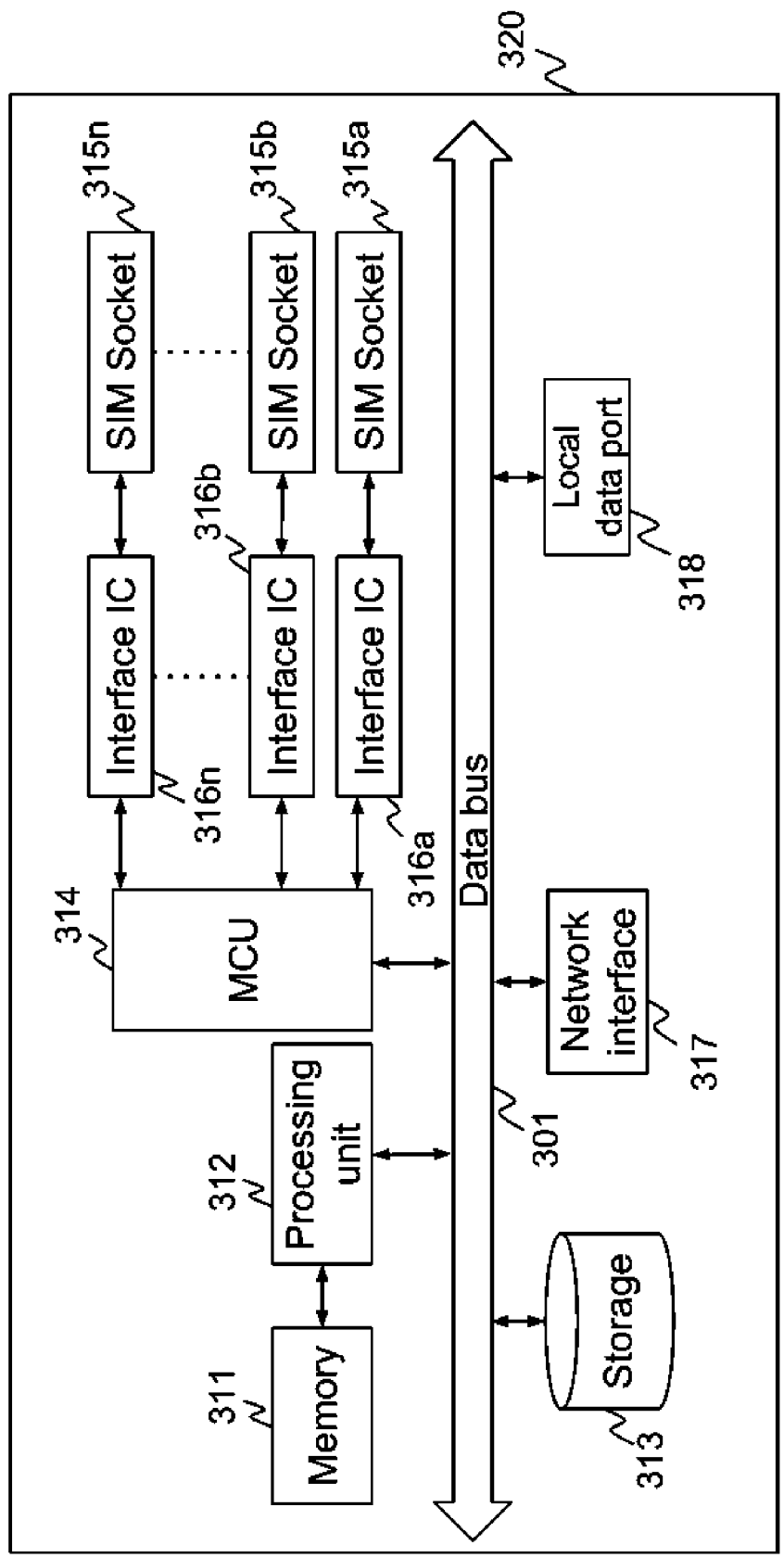
FIG. 3B illustrates a basic block diagram of a communication apparatus or a SIM bank according to one of the embodiments of the present invention.
Figure 3C:
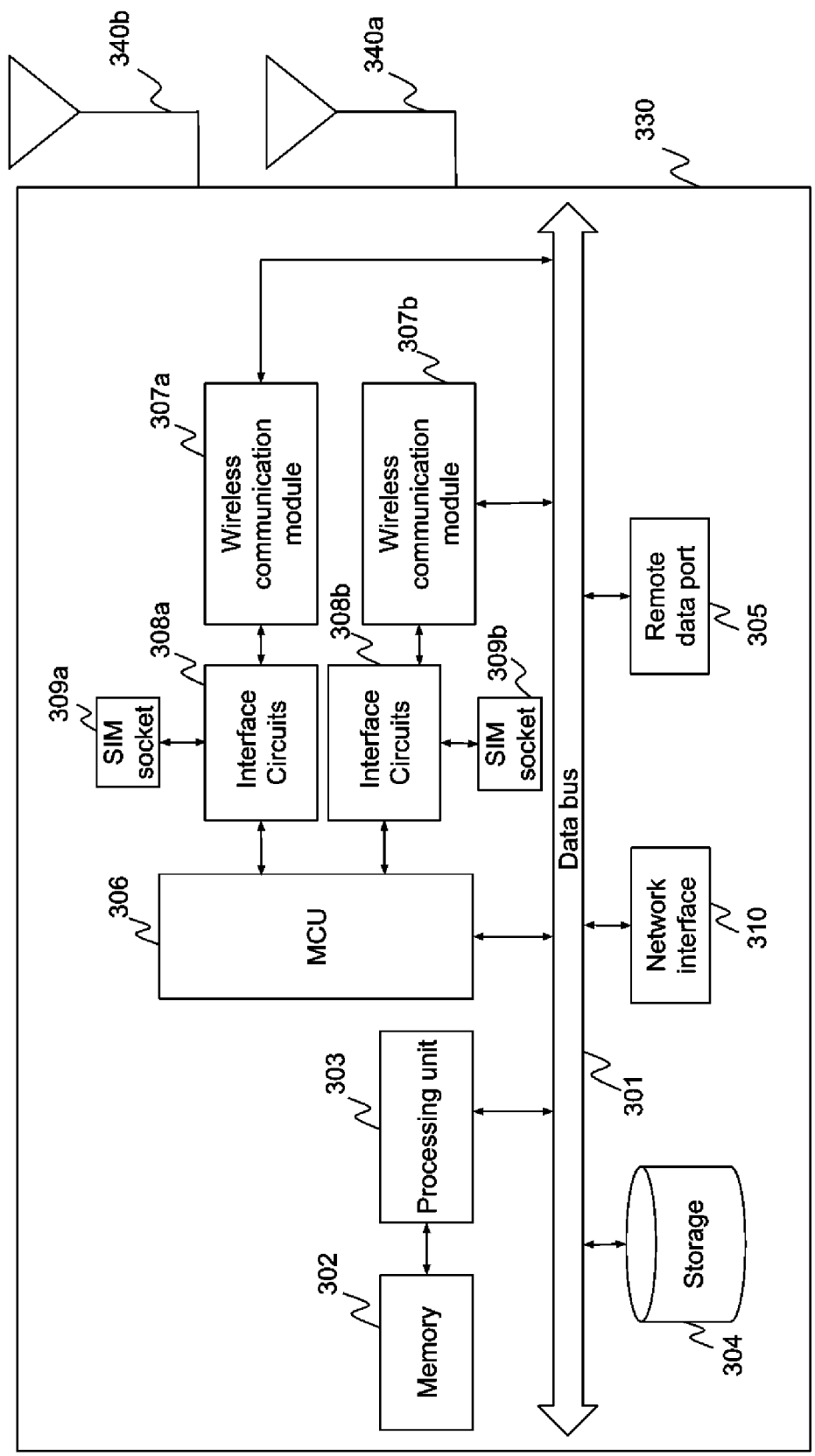
FIG. 3C illustrates a basic block diagram of a cellular router identical to cellular router 101 illustrated in FIG. 1B.

FIG. 3B illustrates a basic block diagram of an example communication apparatus or a SIM bank according to one of the embodiments of the present invention.

Communication apparatus 320 comprises processing unit 312, memory 311, storage unit 313, MCU 314, data bus 301, local data port (LDP) 318, LAN interface 317 interface integrated circuits (ICs) 316 and SIM sockets 315. Processing unit 312 and memory 311 are connected with each other directly. There is no limitation to the number of interface ICs.

Processing unit 312 executes program instructions or code segments for implementing embodiments of communication apparatus 320 of the present invention.

Memory 311 and storage unit 313 are non-transitory computer readable storage medium. The storage medium may include a number of software modules that can be implemented as software code to be executed by processing unit 312 using any suitable computer instruction type. The software code may be stored as a series of instructions or commands, or as a program in the storage medium.

LDP 318 is optional and sends and receives data including SIM card information to and from cellular router 300. LDP 318 is also capable of performing as a LAN interface.

LAN interface 317 is capable of connecting to one or more hosts and/or nodes for sending and receiving information.

MCU 314 sends and receives data including SIM card information to and from SIM cards plugged in SIM sockets 315. MCU 314 is further capable of sending and receiving data including SIM card information to and from the cellular router through LDP 318. MCU 314 is also used to encapsulate and retrieve data, including SIM card information sent to and from cellular router 300.

Data bus 301 connects processing unit 312 directly or indirectly to storage unit 313, MCU 314, LAN interface 317 and LDP 318.

Interface ICs 316 are used in conjunction with MCU 314 for communicating with the SIM cards plugged in SIM sockets 315. Interface ICs 316 also perform for shifting voltage up and down as pin voltage MCU 314 may be different from the pin voltage of SIM cards. There is no limitation that Interface ICs 316 must be used in conjunction with MCU 314 for communicating with the SIM cards plugged in SIM sockets 315. In one variant MCU 314 connects to SIM cards plugged in SIM sockets 315 directly when the pin voltage of MCU 314 is same as the pin voltage of the SIM cards. When a SIM card is inserted into or removed from a SIM socket, such as SIM socket 315a, a signal will be generated and received by MCU 314. MCU 314 may then generate a message or a signal for processing unit 312. Then processing unit 312 may then sends a message to a host or a server, such as a cellular router or a SIM directory server, to inform the host or the server about the status change of the SIM socket and/or a SIM card.

Figure 6:
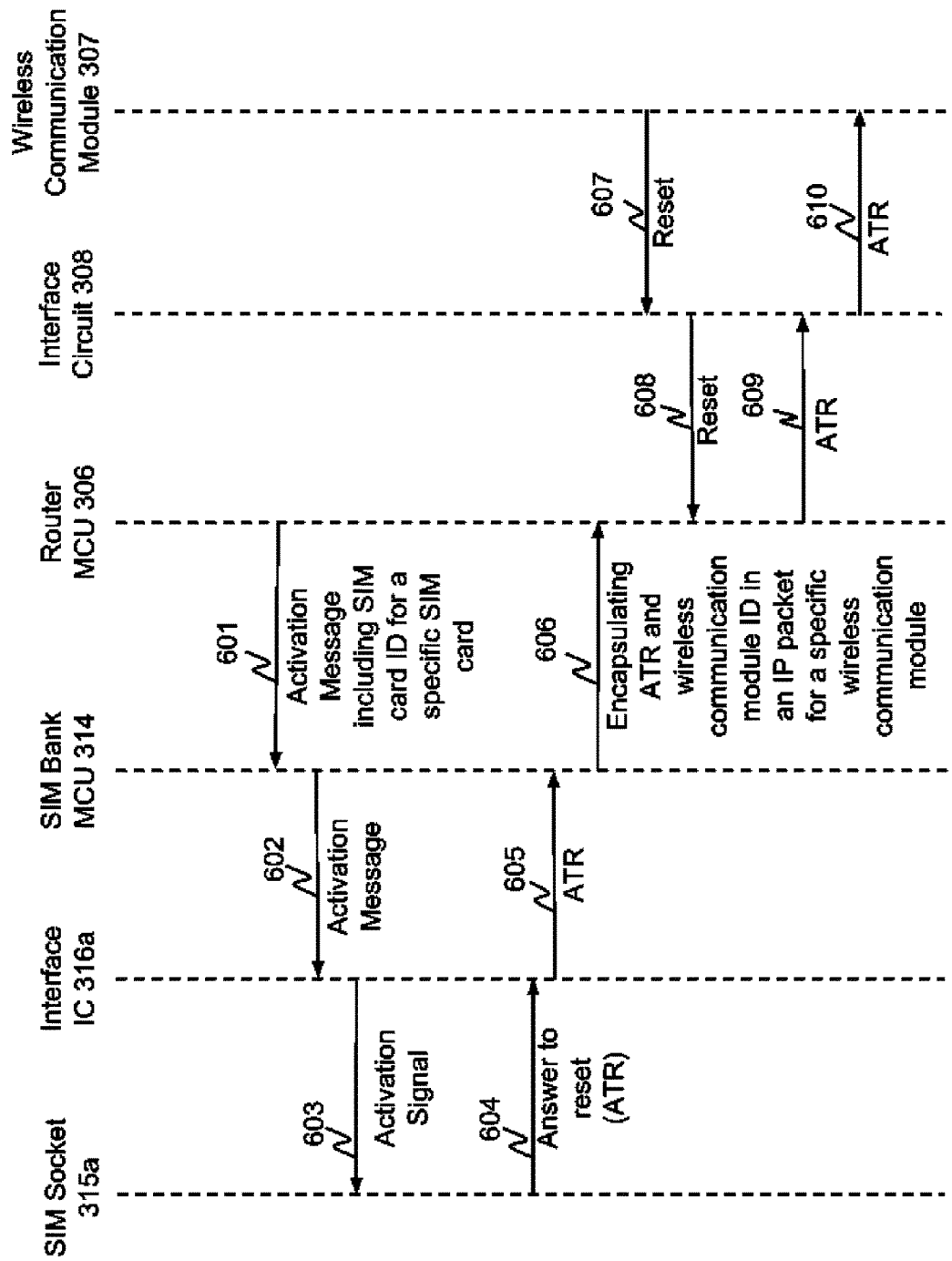
FIG. 6 depicts a sequence diagram illustrating various stages of a message being transmitted and received between an example wireless communication module and an example SIM card.

FIG. 6 illustrates various stages of a message being transmitted and received between an example wireless communication module such as wireless communication module 307a and an example SIM card such as SIM card plugged in SIM socket 315a, via Interface IC 316a, router MCU 306, SIM Bank MCU 314 and Integrated Circuits 308a according to one of the embodiments of the present invention. The message may include Answer to Reset (ATR), control messages, management messages, requests, notifications, indications and authentication messages. The message can be part of SIM card information.

As the distance between wireless communication module 307a and SIM socket 315a is longer than a few inches, the propagation delay is likely to be longer than the propagation delay originally anticipated in SIM card protocol. The longer propagation delay may cause latency for the IP packets in Ethernet frames to reach their destination. Therefore, an ATR is required to be available promptly after a reset signal is generated from wireless communication module 307a to the SIM card plugged in SIM socket 315a. The ATR is an output message generated by the SIM card plugged in SIM socket 315a conforming to ISO/IEC 7816 standards. The ATR is followed by an electrical reset of the SIM card's chip in SIM socket 315a, and in one example, is used as a first indication that the SIM card plugged in SIM socket 315a appears operative. The ATR also conveys information about the nature and state of the SIM card plugged in SIM socket 315a and communication parameters proposed by the SIM card plugged in SIM socket 315a. For the present embodiment, the ATR is achieved by transmitting and receiving a series of control messages between wireless communication module 307a and the SIM card plugged in SIM socket 315a as illustrated accordingly to steps in FIG. 6.

In step 601, an activation message is sent from router MCU 306 to SIM Bank MCU 314. The activation message is used to cause interface IC 308a to send an activation signal for a specific SIM card plugged in SIM socket 315a. In order to identify the specific SIM card plugged in SIM socket 315a from the SIM cards plugged in SIM sockets 315, the activation message is accompanied by the SIM card identification. The activation message along with the SIM card identification are encapsulated in one or more IP packets, and then sent to SIM Bank MCU 314. The one or more IP packets may also be embedded in one or more Ethernet frames by router MCU 306 and sent to SIM Bank MCU 314.

In one example, the activation signal pulls the reset pin of the specific SIM card low for about 100 ms, and then drive the reset pin high again. Depending on the specification of the specific SIM card, the activation signal may also pull the reset pin high.

Figure 2B:
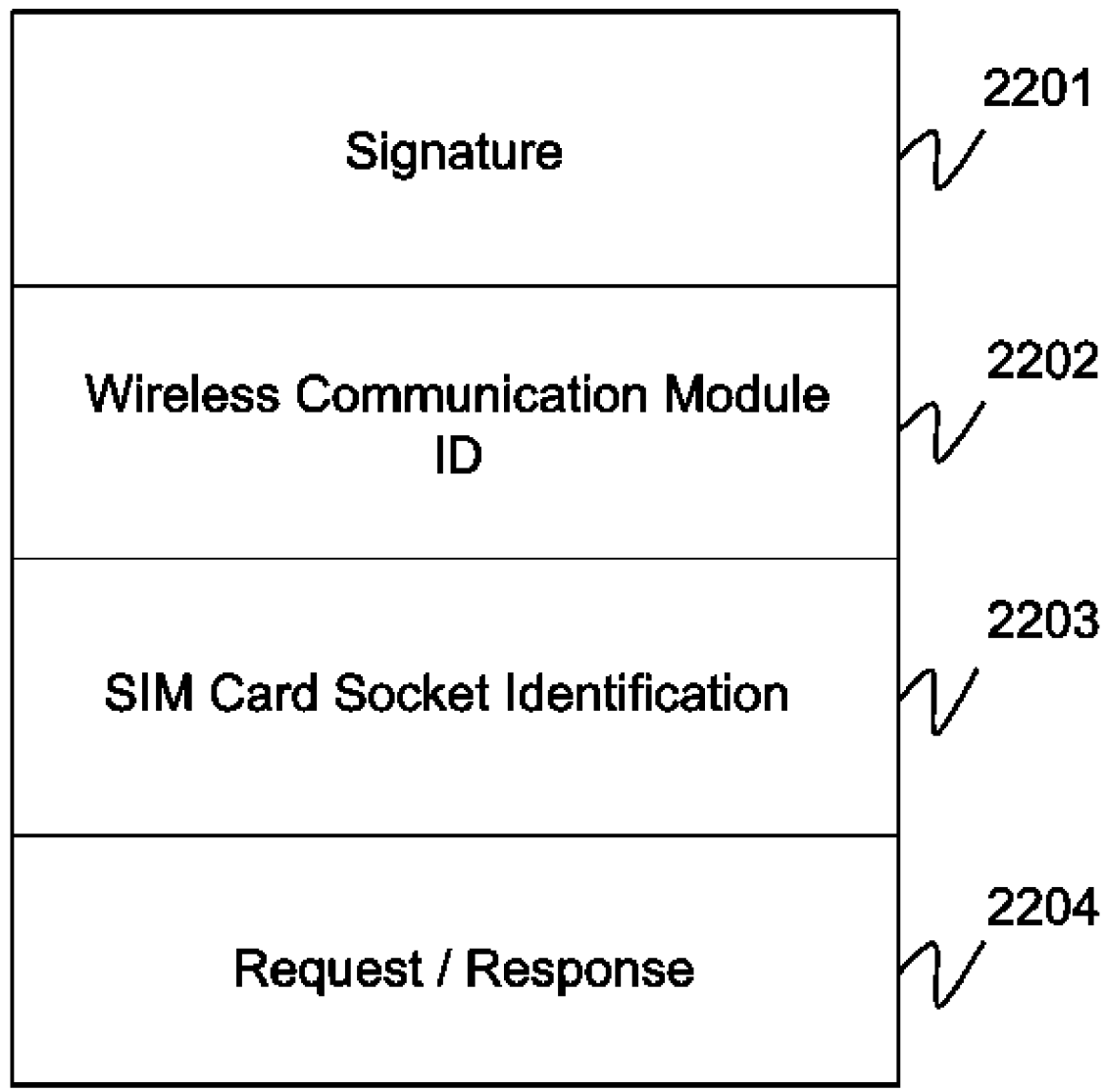
FIG. 2B illustrates a format for a message encapsulated in payload of an IP packet according to one of the embodiments of the present invention.

There is no limitation on the format of the one or more messages comprising the request or reply that are transmitted and received between router MCU 306 and SIM Bank MCU 314. There is also no limitation on the communication technologies for transmitting and receiving the messages. For example, Internet Protocol (IP) pages may be used for encapsulating message between router MCU 306 and SIM Bank MCU 314. The message may be comprised of specific fields for specific information. FIG. 2B illustrates one of the formats of the message encapsulated in payload of one such IP packet. Field 2201 holds a signature. The signature is used for security and authentication purposes such as to authenticate the source and confirm integrity of the message. The signature can also be used by recipient processors, such as router MCU 306 and SIM Bank MCU 314 to recognize the IP packet for SIM card message, especially in the case that the IP address of the recipient has not been discovered. As cellular router 330 has more than one wireless communication module 307, identification is needed to distinguish the recipient and/or sender of the request/response. Field 2202 holds the specific identification for a wireless communication module. Similarly, communication apparatus 320 may have one or more SIM cards plugged in SIM sockets 315. Each SIM card socket has a specific SIM card socket identification. Field 2203 holds the specific identification for identifying a specific SIM card socket. Field 2204 holds the request or response that is being conveyed between the wireless communication module and the SIM card plugged in a SIM card socket.

Figure 7:
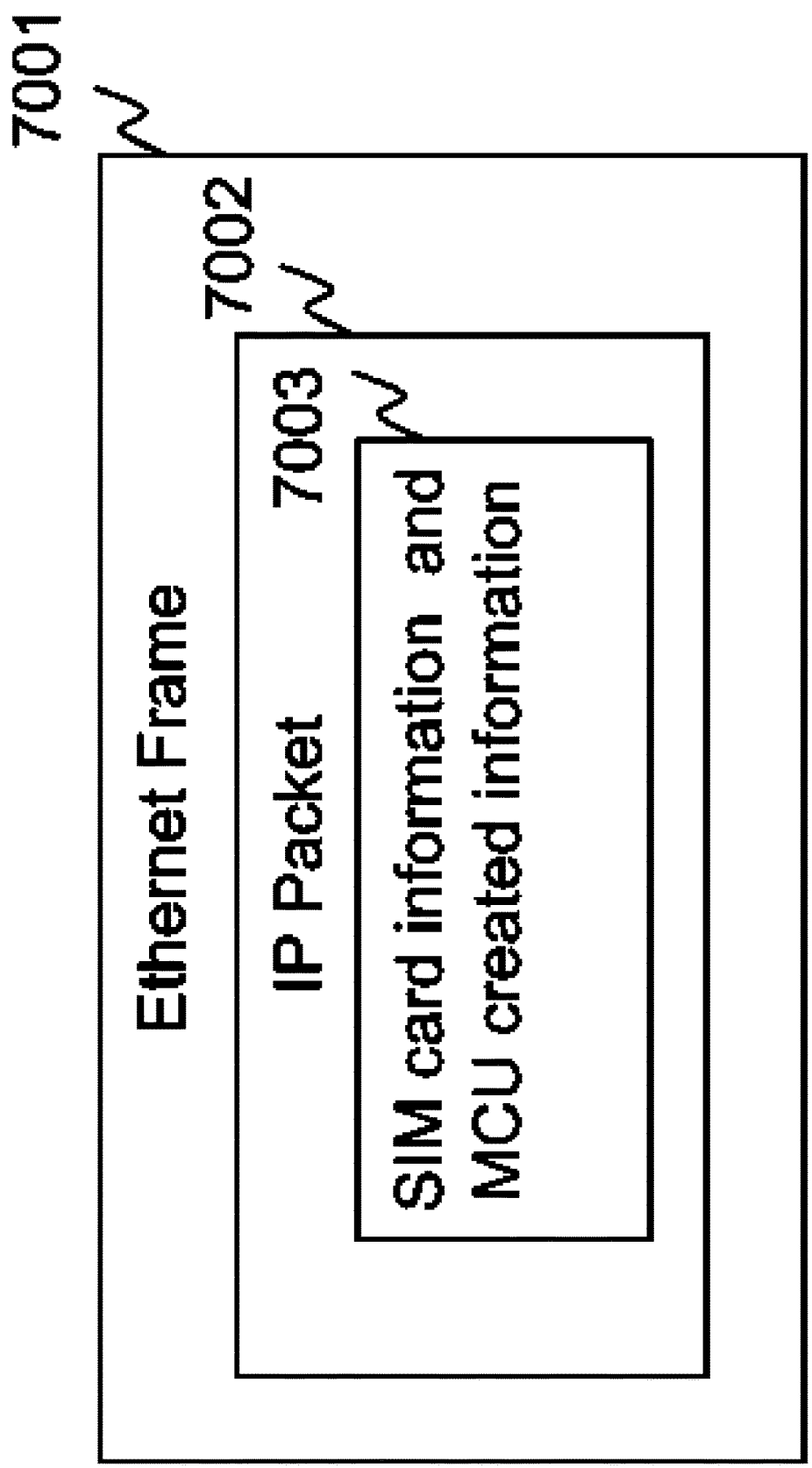
FIG. 7 illustrates the structure of a message when an Ethernet is used to transmit and receive data according to one of the embodiments of the present invention.

In one example, router MCU 306 and SIM Bank MCU 314 communicates via Ethernet protocol. FIG. 7 illustrates the structure of a message when an Ethernet is used to transmit and receive data between router MCU 306 and SIM Bank MCU 314. Ethernet frame 7001 is comprised with IP packet 7002. IP packet 7002 is capable of holding data including SIM card information and MCU created information 7003.

Router MCU 306 and SIM Bank MCU 314 are capable of encapsulating data into the payload of one or more IP packets 7002 and embed the one or more IP packets 7002 into the payload of one or more Ethernet frames 7001.

For illustration purpose, router MCU 306 encapsulates the activation message in field 2204, along with signature and SIM card socket identification in fields 2201, and 2203 respectively, into the payload of one or more IP packets and embeds the one or more IP packets into the payload of one or more Ethernet frames. Router MCU 306 then transmits the one or more Ethernet frames to SIM Bank MCU 314.

When the activation message from router MCU 306 is received by SIM Bank MCU 314, SIM Bank MCU 314 first de-embeds the one or more Ethernet frames and retrieves the signature in field 2201, SIM card socket identification in field 2203 and activation message in field 2204 from the one or more IP packets. Then SIM Bank MCU 314 transmits the activation message in field 2204 to an interface IC connected to a SIM card plugged in one of the SIM card sockets according to SIM card socket identification in field 2203. When an activation signal sent from SIM Bank MCU 314 through an interface IC is received by the SIM card, the SIM card will generate an ATR. The ATR is then transmitted to SIM Bank MCU 314 through its corresponding interface IC. SIM Bank MCU 314 receives the ATR and encapsulates the ATR in field 2204, along with signature and SIM card socket identification in fields 2201 and 2203 respectively, into the payload of one or more IP packets. SIM Bank MCU 314 then embeds the one or more IP packets into the payload of one or more Ethernet frames and transmits the one or more Ethernet frames to router MCU 306. For the present illustration, wireless communication module identification in field 2202 is left empty and is determined by router MCU 306 according to the specific identification of wireless communication module 307a that will send the reset signal.

In one variant, router MCU 306 sends the activation message to SIM Bank MCU 314 leaving the SIM card socket Identification in field 2203 empty. In such case, SIM Bank MCU 314 will retrieve the signature and activation message from field 2201 and 2204 respectively. SIM Bank MCU 314 will then send an activation message to a randomly chosen interface IC connected to one of the SIM cards plugged in SIM socket 315.

In step 602, the activation message stored in request/response in field 2204 is received in the form of one or more Ethernet frames at SIM Bank MCU 314. The one or more Ethernet frames are then de-embedded and the one or more IP packets are decapsulated at SIM Bank MCU 314 in order to retrieve the activation message, the SIM card socket identification and signature from fields 2204, 2203 and 2201 respectively. After the activation message is retrieved, the activation message is sent to the interface IC connected to the specific SIM card socket according to the SIM card socket identification in field 2203. For the present embodiment the SIM card socket identification in field 2203 is for SIM socket 315a and the activation message is sent to interface IC 308a by SIM Bank MCU 314 accordingly.

In step 603, the activation message is received by interface IC 308a. When the SIM card plugged in SIM socket 315a receives the activation signal, it will send an ATR.

In one variance, when SIM Bank MCU 314 is capable of communicating with the SIM card in SIM socket 315a directly, interface IC 308a may not be needed and the activation message in step 602 is sent directly to the SIM card plugged into SIM socket 315a from SIM Bank MCU 314.

In step 604, the activation signal is received by the SIM card plugged in SIM socket 315a. After receiving the activation signal, an ATR is sent in response by the SIM card plugged in SIM socket 315a to interface IC 308a.

In one variance, when the SIM card plugged in SIM socket 315a is capable of communicating with the SIM Bank MCU 314 directly, interface IC 308a is not needed and the ATR in step 604 is sent directly to the SIM Bank MCU 314 from SIM card plugged into SIM socket 315a.

In step 605, the ATR is sent from interface IC 308a to SIM Bank MCU 314.

In step 606, the ATR is received by SIM Bank MCU 1835. When the ATR is received by SIM Bank MCU 314, SIM Bank MCU 314 stores the identification of SIM socket 315a. SIM Bank MCU 314 further creates a signature. The ATR then accompanied by a signature and SIM card socket identification is encapsulated in the payload of one or more IP packets according to the format illustrated in FIG. 2B. The one or more IP packets are then embedded in one or more Ethernet frames by SIM Bank MCU 314 and sent to router MCU 306. The ATR is received by router MCU 306 in the form of one or more Ethernet frames. The one or more Ethernet frames are then de-embedded and the one or more IP packets are decapsulated at router MCU 306 in order to retrieve the ATR. After the ATR is retrieved, the ATR is sent to wireless communication module 307a via interface circuits 316a once a reset signal is received by router MCU 306.

When the distance between the SIM card plugged in SIM socket 315a and wireless communication module 307a is more than one meter, the ATR sent in response from the SIM card plugged in SIM socket 315a may take longer time than is desirable to propagate to wireless communication module 307a. In order to overcome this drawback, time limits are allocated to receive the response from the SIM card plugged in SIM socket 315a. The ATR sent from the SIM card plugged in SIM socket 315a in response to the activation signal is received by router MCU 306. After receiving the ATR, the ATR is retrieved and stored by router MCU 306. Once a reset signal is received by router MCU 306 from wireless communication module 307a, the ATR is sent promptly to wireless communication module 307a within a first or a second time limit such as 0.1 or 1 second respectively. This configuration is provided in order to improve the response time. In one example, when wireless communication module 307a needs the ATR information in order to begin a communication session with the SIM card plugged in SIM socket 315a, the ATR is retrieved by sending a reset signal to router MCU 306, avoiding the necessity of communicating at that point with the SIM card plugged in SIM socket 315a.

In step 607, a reset signal initiated by wireless communication module 307a is received by interface circuits 316a to send to router MCU 306. Wireless communication module 307a may not be capable of communicating with router MCU 306 since the output voltage from wireless communication module 307a may not match the input voltage for router MCU 306. Interface circuits 316a comprising of a voltage shifter and other related circuitries help for shifting the voltage to send the reset signal to router MCU 306.

In one variant, when wireless communication module 307a is capable of communicating with router MCU 306 directly without converting voltage, the voltage shifter in interface circuits 316a is then not needed, and the reset signal in step 607 may be sent directly to router MCU 306 from wireless communication module 307a.

In step 608, the reset signal is received by router MCU 306 from interface circuits 316a. When router MCU 306 receives the reset signal, router MCU 306 stores the identification of wireless communication module 307a in order to send the ATR. The ATR is then ready to be sent to wireless communication module 307a via interface circuits 316a.

In step 609, the ATR is received by interface circuits 316a from router MCU 306. The voltage shifter in interface circuits 316a helps shifting the voltage to send the ATR to wireless communication module 307a.

In one variance, when router MCU 306 is capable of communicating with wireless communication module 307a directly, interface circuits 316a may not be needed and the ATR in step 609 is sent directly to wireless communication module 307a from router MCU 306.

In step 610, the ATR is received at wireless communication module 307a. After receiving the ATR, a basic communication channel is established between the SIM card plugged in SIM socket 315a and wireless communication module 307a. Wireless communication module 307a then starts communicating with the SIM card plugged in SIM socket 315a using the information contained in the ATR.

There is no limitation that the sequences illustrated in FIG. 6 only applies to SIM socket 315a. The sequences also apply to other SIM sockets in 315, including SIM socket 315n.

There is no limitation in time when step 607 is performed after step 606. For example, step 607 may be performed within a second after step 606 is performed. In another example, step 607 may be performed a few days after step 606 is performed.

In one variant, the ATR is cached or stored and a communication session is established between one wireless communication module and one SIM card plugged in one SIM card socket. The sequences illustrated in FIG. 6 applies for the variant embodiment as well except that there will be no need to assign the IDs of SIM card plugged in a SIM card socket and wireless communication module in the one or more IP packets for step 601 and 606 respectively.

In one variant, step 602 is initiated by SIM Bank MCU 314 without step 601 being performed. Therefore step 602 is performed without receiving a message or request from router MCU 306. When ATR is received at step 605, the ATR is then stored by SIM Bank MCU 314 in a non-transitory storage medium and not sent to router MCU 306 until router MCU 306 requests it. As it is possible that a cellular router may not need SIM card information from a particular SIM card, there is no need for router MCU 306 to have the ATR of that particular SIM card. When router MCU 306 sends the activation message by performing step 601, as steps 602-605 have already been performed, step 606 is capable of being performed much sooner comparing to when steps 602-605 not been performed earlier. In one further variant, step 606 is performed without step 601 being performed. The ATR is sent to router MCU 306 for storage at a non-transitory computer readable storage medium at the cellular router. This allows ATR to be sent to wireless communication module 307a quickly in step 609 as the ATR is already stored in the non-transitory computer readable storage medium at the cellular router.

There is no limitation that only ATR is stored at the non-transitory computer readable storage medium at the communication apparatus or cellular router. Other SIM card information can also be stored. For example, international mobile subscriber identity (IMSI) and contact information can also be stored.

In one variant, there is no SIM card identification information in the activation message at step 601 as router MCU 306. SIM Bank MCU 314 may then select one of its SIM cards to send the activation message at step 602.

There is also no limitation on the number of ATRs can be cached or stored at a communication apparatus or a cellular router. For example, there are ten SIM cards inserted in SIM card sockets at communication apparatus 320. Communication apparatus 320 sends activation messages to the ten SIM cards and then stored the ATRs received. In another example, router MCU 306 sends activation messages to the ten SIM cards and then stored the ATRs received.

In one variant, when an ATR has been longer than a first period of time, the ATR is discarded. The first period of time should not be less than one minute. The preferred time period is from five minutes to one day. The longer the first period of time, the higher probability that the SIM card corresponding to the ATR may not be available for use anymore.

In one variant, when a SIM card is being used or removed from communication apparatus 320, communication apparatus 320 will send a message to cellular router to inform the cellular router that the SIM card cannot be selected. Then the cellular router will not include the identification of the SIM card in the activation message. The cellular router may include the identification of another SIM card. In one variant, the cellular router may not include any SIM card identification in the activation message if there is no preference of which SIM card to use or no knowledge of SIM identification. In one variant, cellular router may include SIM card selection criteria in the activation message to let communication apparatus 320 to select a SIM card for the wireless communication module.

One of the reasons to discard the ATR is because the SIM card corresponding to the ATR may be being used by another cellular router or being removed from the communication apparatus. Therefore, the ATR cannot be used anymore.

Figure 4A:
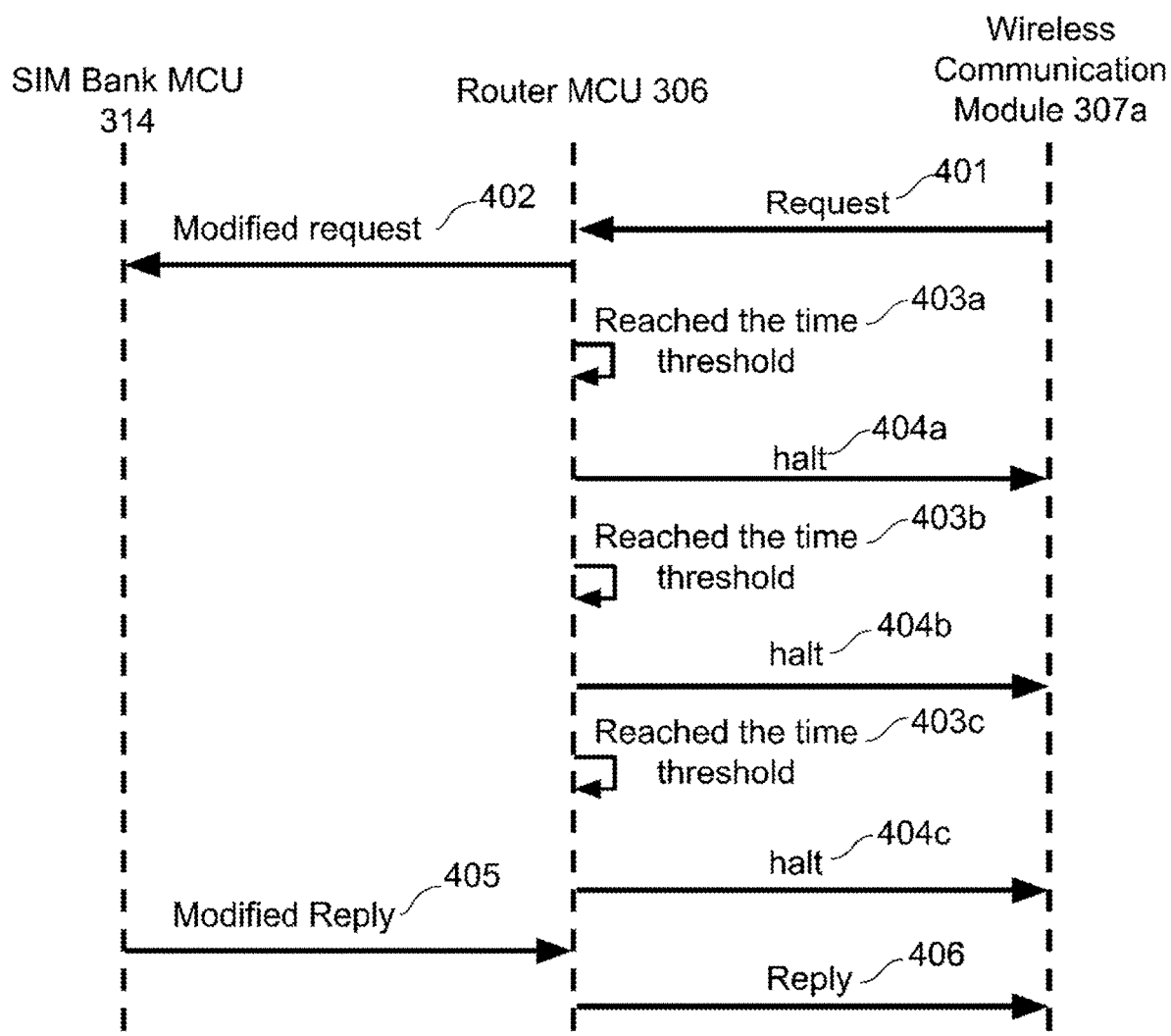
FIG. 4A depicts an example sequence diagram illustrating steps and events for a particular scenario associated with the present invention.

FIG. 4A depicts an example sequence diagram illustrating steps and events for a particular scenario associated with the present invention. The present embodiment tries to extend the waiting time of wireless communication module 307a. After wireless communication module 307a sends a request for a reply from a corresponding SIM card, router MCU 306 sends a halt command to wireless communication module 307a to inform wireless communication module 307a that the corresponding SIM card is still processing the request. The halt command is a message with procedure byte containing null value, i.e. value 60, according to ISO/IEC 7816 family of standards with T=0 protocol (version A). In this particular scenario, the request comprises of a five bytes header and a body. Therefore, the complete size of the request is at least five bytes long. For readability, the term "FBR" is used herein to refer to request that is at least five bytes long.

Request 401 is an FBR and is first transmitted from wireless communication module 307a. Request 401 is then passed through interface circuits 308a and reaches router MCU 306.

Router MCU 306 then modifies request 401 to request 402 according to the format illustrated in FIG. 2B and then transmits request 402 to SIM Bank MCU 314. The transmission of request 402 is managed using Transmission Control Protocol (TCP) and therefore is considered to be reliable. In one variant, request 402 is sent using User Datagram Protocol (UDP) when speed is more important than reliability, since UDP is a connectionless protocol the speed becomes a trade-off over reliability unlike TCP. Furthermore, UDP transmission of request 402 can be used in a network environment where router MCU 306 wants to broadcast or multicast request 402 in order to connect to more than one SIM Bank MCU 314.

After 0.8 seconds for example, router MCU 306 reaches its time threshold 403a. It should be appreciated that there is no limitation to at how many seconds time thresholds 403 could be set as long as it is shorter than the timeout period of wireless communication module 307a. Time thresholds 403 may be predetermined based on instructions from a user or administrator of cellular router 300. Time thresholds 403 may also be preconfigured by the manufacturer of cellular router 300. At one example, the time threshold for router MCU 306 could be set at 0.8 seconds when the timeout period of a wireless communication module is set to 1.2 seconds. At 0.8 seconds, when there is no reply received from SIM Bank MCU 314, router MCU 306 transmits halt command 404a to wireless communication module 307a. Halt command 404a is used to instruct wireless communication module 307a to wait further. When wireless communication module 307a receives halt command 404a, it will continue to wait for a reply for a period of time.

In this illustration, if a reply is not yet received within 0.8 seconds, router MCU 306 again reaches its time threshold 403b i.e. 1.6 seconds which is 0.8 seconds after halt command 404a being sent. Router MCU 306 then repeats the procedure disclosed earlier and transmits halt command 404b to wireless communication module 307a. When wireless communication module 307a receives halt command 404b, it will wait for a reply for another 1.2 seconds. Similarly, router MCU 306 again transmits halt command 404c to wireless communication module 307a at time threshold 403c i.e. 2.4 seconds, which is 0.8 seconds after halt command 404b is being sent.

Reply 405 is received in the format illustrated in FIG. 2B. After reply 405 is received, router MCU 306 then extracts the SIM card information from reply 405 and sends the SIM card information in reply 406 to wireless communication module 307a. As reply 406 has already been sent to wireless communication module 307a, router MCU 306 then stops transmitting halt commands to wireless communication module 307a since there is no need to extend the timeout period for reply 405 anymore. Wireless communication module 307a then performs according to the reply received. In another scenario, reply 405 is still not received within the third extended timeout period and router MCU 306 again approaches a time threshold. In such case for every time router MCU 306 approaches its time thresholds without receiving a reply from SIM Bank MCU 314, router MCU 306 transmits halt commands to wireless communication module 307a to reset the timer and tries to extend the timeout period of wireless communication module 307a. As a result, the 1.2 seconds timeout period can be extended to one minute for example. Furthermore, there is no limitation that the timeout period for wireless communication can only be extended to one minute. The timeout period can be extended beyond one minute when desired, but limited by the requirements of wireless communication module 307a.

The extension of the timeout period can be predetermined based on instructions from a user or administrator of cellular router 300. In another example, the number of halt commands sent by router MCU 306 has reached a halt command sent threshold (HST) and router MCU 306 still does not receive a reply from SIM Bank MCU 314, router MCU 306 discontinues transmitting the halt commands to wireless communication module 307a. One of the reasons for discontinuing sending halt commands after HST is reached is to reduce the loading on router MCU 306 because wireless communication module 307a accepts only a number of halt commands in a certain period of time, for example ten halt commands in eight seconds. Depending on the model of wireless communication module 307a, it may ignore incoming halt commands after HST is reached. In certain model of wireless communication module 307a, after HST is reached, wireless communication module 307a will reset the corresponding SIM card. The value of HST depends on the specification of a wireless communication module and may vary for different wireless communication modules. The time interval among and the number of halt commands to be sent can be predetermined based on instructions from a user or administrator of cellular router 300. In one embodiment, the time interval between two consecutive halt messages is no longer than two seconds.

Figure 4B:
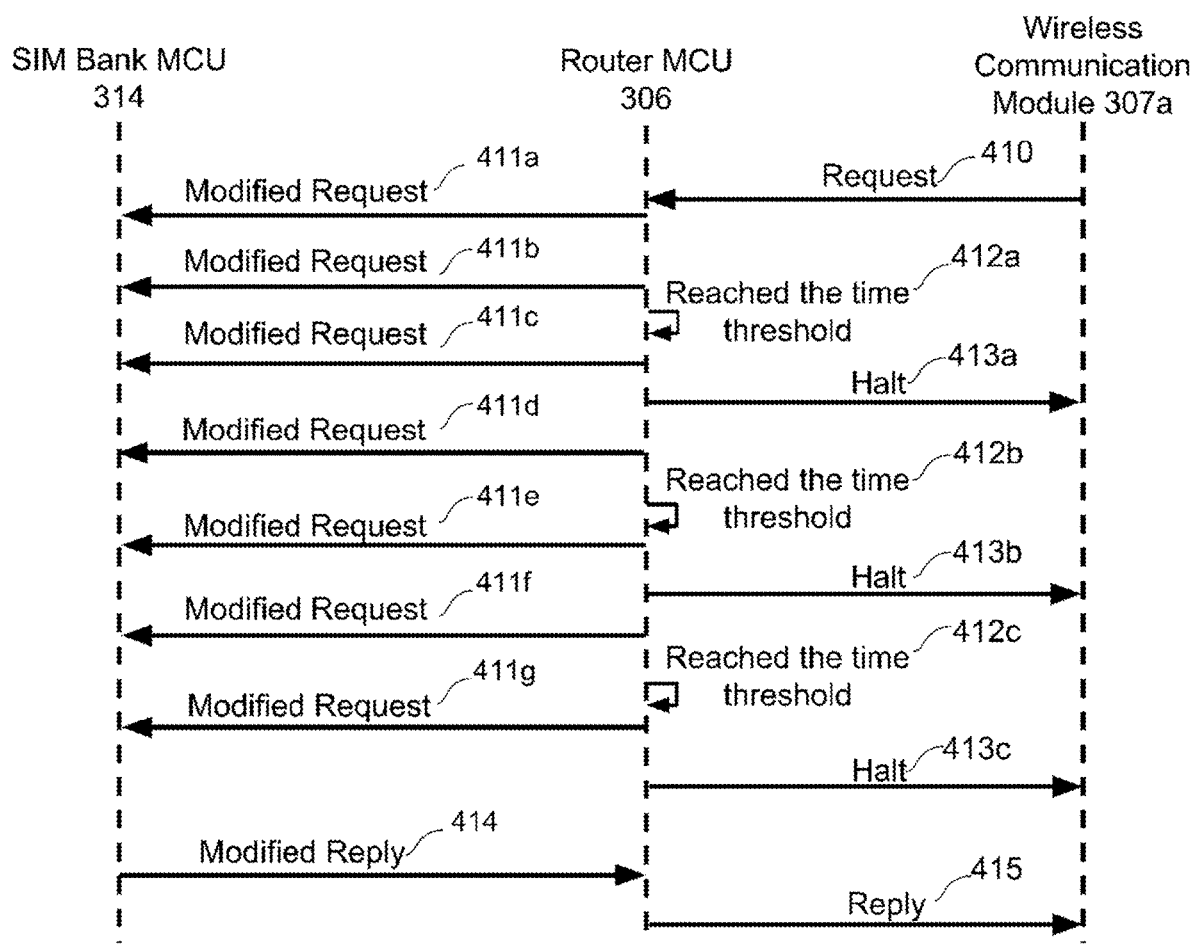
FIG. 4B depicts an example sequence diagram illustrating steps and events for a particular scenario associated with the present invention.

FIG. 4B depicts an example sequence diagram illustrating steps and events for a scenario associated with the present invention. Comparing to the example sequence diagram illustrated in FIG. 4A, a plurality of modified requests 411a-g are sent, instead of only request 402 is sent, before a modified reply is received by router MCU 306.

In this scenario, for illustration purpose, router MCU 306 sends modified request 411a after received request 410. If no modified reply from SIM Bank MCU 314 is received before expiration of a time threshold, router MCU 306 sends modified request 411b. The time threshold is a time value ranging from one hundred milliseconds to two seconds. For readability, we refer this time threshold as modified request resent time threshold (MRRTH) hereinafter. The lower MRRTH is, the sooner router MCU 306 sends a modified request. As time moves on, when at the next MRRTH and still no modified reply from SIM Bank MCU 314 is received before expiration, router MCU 306 sends modified request 411c. Router MCU 306 keeps sending modified requests 411 to SIM Bank MCU 314 until modified reply 414 is received. For illustration purpose, modified reply 414 is received after modified request 411g is sent. When modified reply 414 is received, router MCU 306 sends reply 415 based on modified reply 414, and stops sending modified requests 411.

While modified requests 411 are sent, router MCU 306 sends halt commands 413 at time thresholds 412 such as halt commands 413a-413c at time thresholds 412a-412c respectively to wireless communication module 307a until either modified reply 414 is received or number of halt commands sent has reached HST.

In one example, MRRTH is forty milliseconds, and the time threshold is eighty milliseconds. Therefore, router MCU 306 sends a modified request every forty milliseconds and a halt command every eight milliseconds until modified reply 414 is received or number of halt commands has reached HST. There is no limitation that MRRTH must be forty milliseconds. For example, MRRTH can be set up a user, an administrator or manufacturer in the range of one millisecond to one thousand milliseconds.

It is preferred that modified requests 411 are transmitted from router MCU 306 using UDP transmission. Using UDP for transmitting modified requests 411 incurs less delay compared to TCP. If modified requests 411 are transmitted using TCP transmission to SIM Bank MCU 314.

When SIM Bank MCU 314 receives the first of modified requests 411, SIM Bank MCU 314 decapsulates that modified requests 411 to retrieve the request and then transmits the request to a corresponding SIM card. The corresponding SIM card then receives the request and generates a reply to SIM Bank MCU 314. SIM Bank MCU 314 then encapsulates the reply, and transmits modified reply 414 according to the format illustrated in FIG. 2B to router MCU 306.

When SIM Bank MCU 314 receives more than one of modified requests 411, SIM Bank MCU 314 ignores modified requests received after the first modified request received. For illustration purpose, modified request 411b is the first modified request received by SIM Bank MCU 314. SIM Bank MCU 314 will then ignore modified request 411a, 411c-g. In one example, modified requests 411a-g are embedded with a number to indicate the sequence, therefore SIM Bank MCU 314 is able to use the number to determine modified request 411*a* and 411*c-g* are encapsulating request 410.

SIM Bank MCU 314 then transmits the decapsulated request from modified request 411*b* to the corresponding SIM card. The SIM card then generates a reply for the decapsulated request from modified request 411*b* and transmits the reply to SIM Bank MCU 314. Then SIM Bank MCU 314 encapsulates the reply, and transmits modified reply 414 following the format illustrated in FIG. 2B to router MCU 306.

In one example, modified reply 414 is transmitted using TCP. In another example, modified reply 414 is transmitted using UDP. Router MCU 306 then decapsulates modified reply 414 and transmits reply 415 to wireless communication module 307*a*. In one example, when modified reply 414 is transmitted using UDP, a plurality of duplicate modified replies 414 are sent in order to increase the probability that router MCU 306 receives at least one modified reply 414. Since SIM Bank MCU 314 may connect to a plurality of cellular routers 300 concurrently, SIM Bank MCU 314 may be processing a plurality of modified request from and sending out a plurality of modified replies to a plurality of cellular router 300. Therefore, sending out a plurality of modified replies, which encapsulate the same reply, may cause overloading for SIM Bank MCU 314 and higher processing delay.

As there are many different types and models of wireless communication modules available in the market, these wireless communication modules may behave differently and may have different techniques to communicate with SIM cards. For some of the wireless communication modules, halt command is only applicable to FBR. For requests that have header bytes fewer than five bytes, halt command may not be applicable. In the embodiment of example sequence diagram of FIG. 5A, when size of a request from wireless communication module 307*a* is less than five bytes long, the timeout period is reset by router MCU 306 using a break signal. The break signal is a serial break of the serial communication following UART protocol between router MCU 306 and wireless communication module 307. As the break signal is sent through the serial communication, break signal can be used independent of the halt command described in FIG. 4A and FIG. 4B. For example, the break signal can be used together with halt command in sequence to further increase the waiting time of wireless communication module 307*a*. In another example, the break signal and the halt command are used in mixed sequence.

When wireless communication module 307 receives a break signal, wireless communication module 307*a* will consider that the request transmitted earlier to the corresponding SIM card had an error. As a result, wireless communication module 307*a* generates a new request, which holds the same content as the previous request, and then transmits the new request.

After wireless communication module 307*a* transmits request 501*a*, router MCU 306 receives request 501*a* and modifies request 501*a* according to the format illustrated in FIG. 2B to modified request 502*a*. Router MCU 306 then transmits modified request 502*a* to SIM Bank MCU 314.

For illustration purpose, the time threshold is eighty milliseconds and wireless communication module 307*a* will wait for a one hundred and twenty milliseconds before resetting a corresponding SIM card. When router MCU 306 has reached eighty millisecond time threshold 506*a* and has not received a reply from SIM Bank MCU 314, router MCU 306 transmits break signal 503*a* to wireless communication module 307*a*. When wireless communication module 307*a* receives break signal 503*a*, wireless communication module 307*a* sends request 501*b* as wireless communication module 307*a* may consider that request 501*a* had an error and was not received correctly by the corresponding SIM card. After wireless communication module 307*a* has transmitted request 501*b*, wireless communication module 307*a* will wait for a reply to arrive within one hundred and twenty milliseconds. Similarly, when router MCU 306 has reached a further eighty milliseconds time threshold 506*b* and has not received a reply from SIM Bank MCU 314, router MCU 306 repeats the procedure disclosed earlier and sends break signal 503*b* to wireless communication module 307*a*. Wireless communication module then sends request 501*c*.

Router MCU 306 receiving a reply from SIM Bank MCU 314, router MCU 306 sends break signals 513 at every time thresholds 516 such as break signals 513*a*-513*b* at time thresholds 516*a*-516*b*. As time moves on without of router MCU 306 to wireless communication module 307*a* until a reply is received or number of breaks sent has reached a break sent threshold (BST). The preferred time period for the BST that can be transmitted from router MCU 306 to wireless communication module 307*a* can be predetermined based on instructions from a user or administrator of cellular router 300. Throughout the preferred time period, whenever router MCU 306 approaches a time threshold, router MCU 306 sends a break signal to wireless communication module 307*a*.

Requests 501*b-c* are received and then discarded by router MCU 306. One of the reasons for discarding requests 501*b-c* is, since requests 501*b-c* holds the same content as request 501*a* and request 501*a* is already transmitted as modified request 502*a* from router MCU 306 using a reliable connection such as TCP, transmitting further requests 501*b-c* may incur high processing delay for router MCU 306 and SIM Bank MCU 314.

For illustration purpose, modified reply 504 is received by router MCU 306 after receiving request 501*c*. Modified reply 504 is received in the format illustrated in FIG. 2B and is the reply to request 501*a*. After receiving modified reply 504, router MCU 306 stops sending further break signals and sends reply 505 based on modified reply 504 to wireless communication module 307*a*.

Figure 5A:
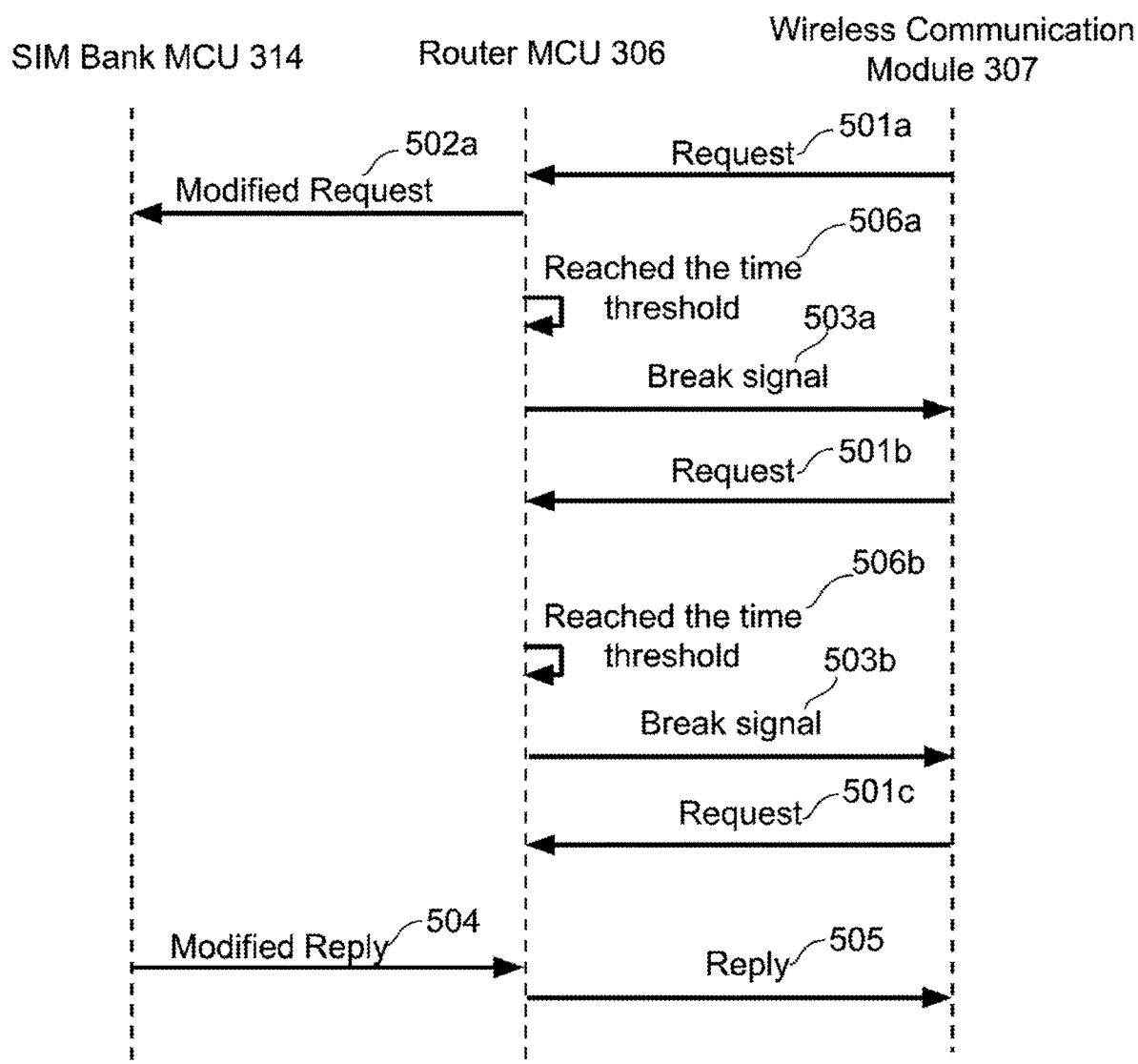
FIG. 5A depicts an example sequence diagram illustrating steps and events for a particular scenario associated with the present invention.
Figure 5B:
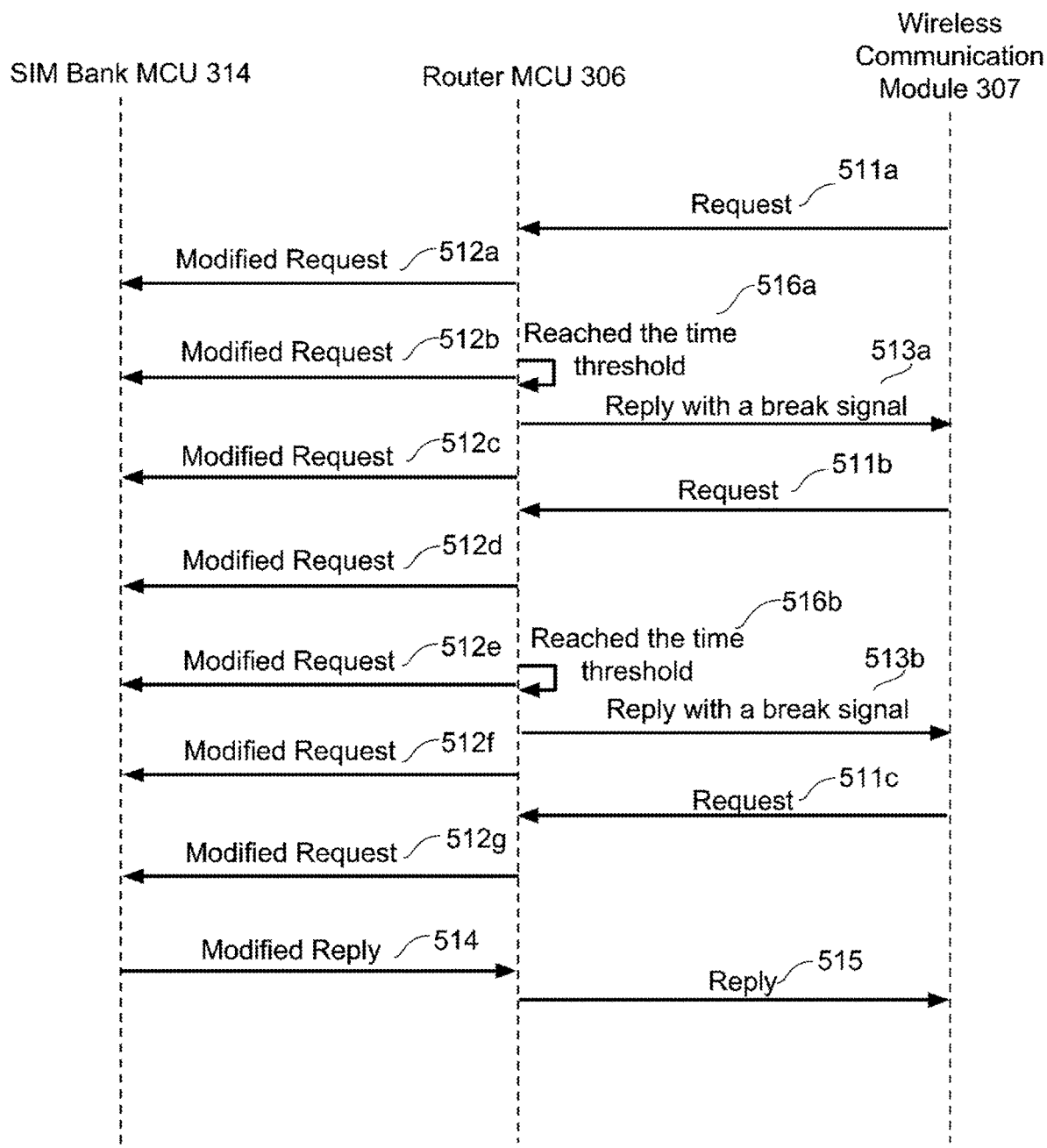
FIG. 5B depicts an example sequence diagram illustrating steps and events for a particular scenario associated with the present invention.

In FIG. 5B, a plurality of modified requests 512*a-g* are sent comparing to FIG. 5A where only modified request 502*a* is sent before a modified reply is received by router MCU 306. In this scenario, for illustration purpose, router MCU 306 sends modified request 512*a* after received request 511*a*. If no modified reply from SIM Bank MCU 314 is received before expiration of a first MRRTH, router MCU 306 sends modified request 512*b*.

As time moves on, when at the next MRRTH and still no modified reply from SIM Bank MCU 314 is received before expiration, router MCU 306 will send additional modified requests, such as modified requests 512*c-g*, until reply 515 is received. Contents of modified request 512*b-g* are the same as the content of modified request 512*a* as modified requests 512*b-g* are encapsulating requests 511*a*. In one example, requests 511*b-c* are received and then discarded by router MCU 306 as content of requests 511*b-c* should be the same as content of request 511*a*.

For illustration purpose, modified reply 514 is received after modified request 512*g* is sent. Router MCU 306 will then send reply 515, based on modified reply 514, to wireless communication module 307*a*, and stops sending further modified requests 512.

It is preferred that modified requests 512 are transmitted from router MCU 306 using UDP transmission for reasons explained earlier in conjunction FIG. 4B. When SIM Bank MCU 314 receives more than one of modified requests 512, SIM Bank MCU 314 ignores modified requests received after the first modified request received. In reference to the process explained earlier in conjunction FIG. 4B where each of modified requests 512 are embedded with a number, SIM Bank MCU 314 uses the number to determine the first received modified request 512a from the rest. Modified reply 514 is the reply to the request from modified requests 512 received earliest by SIM Bank MCU 314.

In one variant, request 511b-c are not discarded. Then a modified request encapsulates the most recently received request. For example, modified requests 512a-c encapsulate request 511a; modified requests 502d-f encapsulates request 511b; modified request 502g encapsulates request 511c. By encapsulating the most recent requests, modified request will be more updated.

While modified requests 512 are sent, router MCU 306 sends break signals 513 periodically at time thresholds 516 to wireless communication module 307a until either modified reply 514 is received or number of breaks sent has reached a BST.

In one alternative, cellular router 300 and communication apparatus 320 are capable of registering and communicating with each other using Short Message Services (SMS). In another alternative, cellular router 300 and communication apparatus 320 are capable of registering with each other using audio signaling. A voice call can be established between a cellular router and a communication apparatus. Then data can be transmitted and received between the cellular router and communication apparatus in the form of specific tones. The benefit of using SMS and/or voice calls for registration and communication between the cellular router and communication apparatus is that most valid SIM cards are capable of being used by the cellular router to connect to a wireless network. The connection may be established using roaming services when the cellular router and communication apparatus are not in the same region or country. After the cellular router establishes a connection to a wireless network, cellular router can then connect with the communication apparatus using SMS and/or voice calls.

Figure 8:
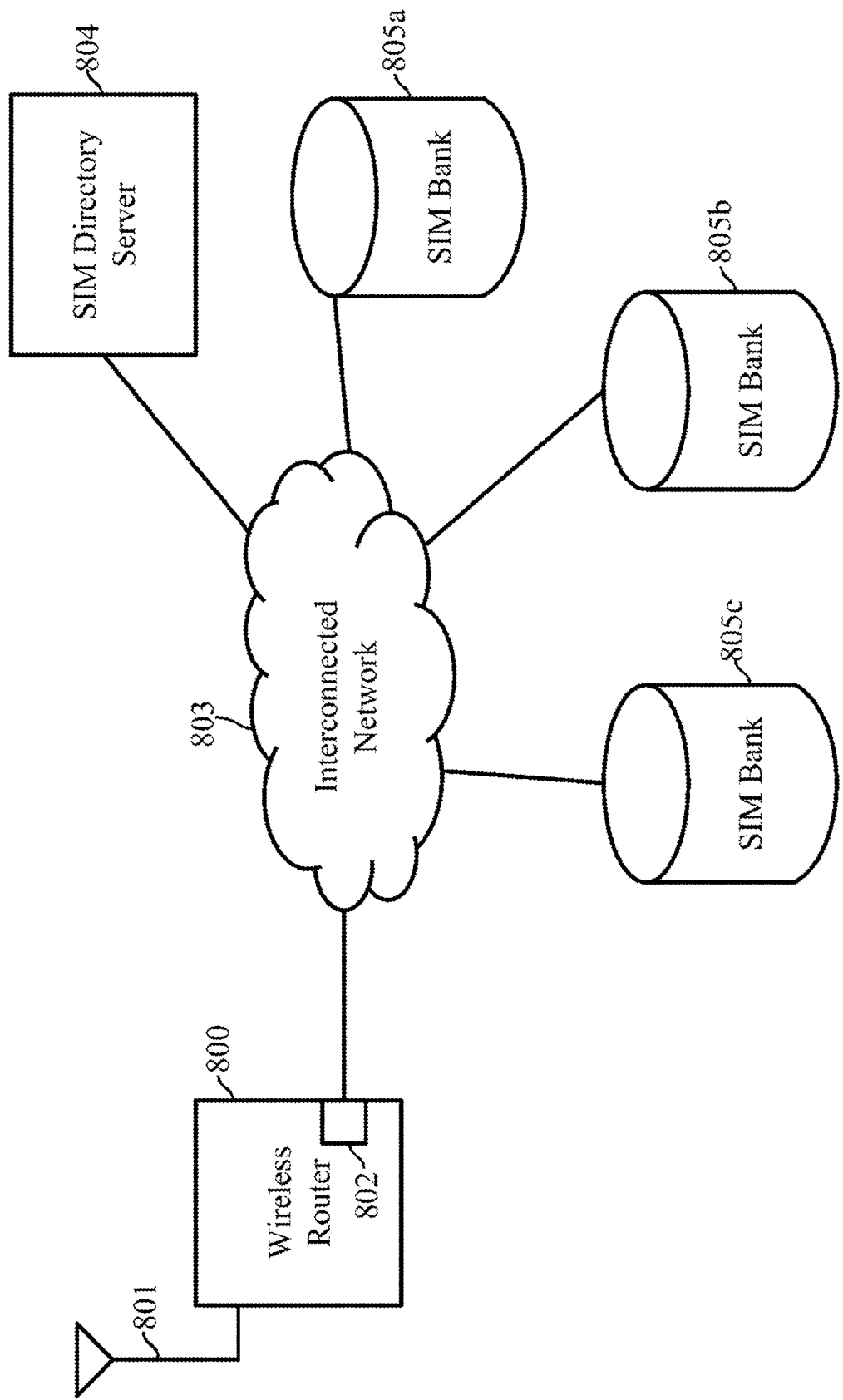
FIG. 8 illustrates a network diagram according to one of the embodiments of the present invention.
Figure 9:
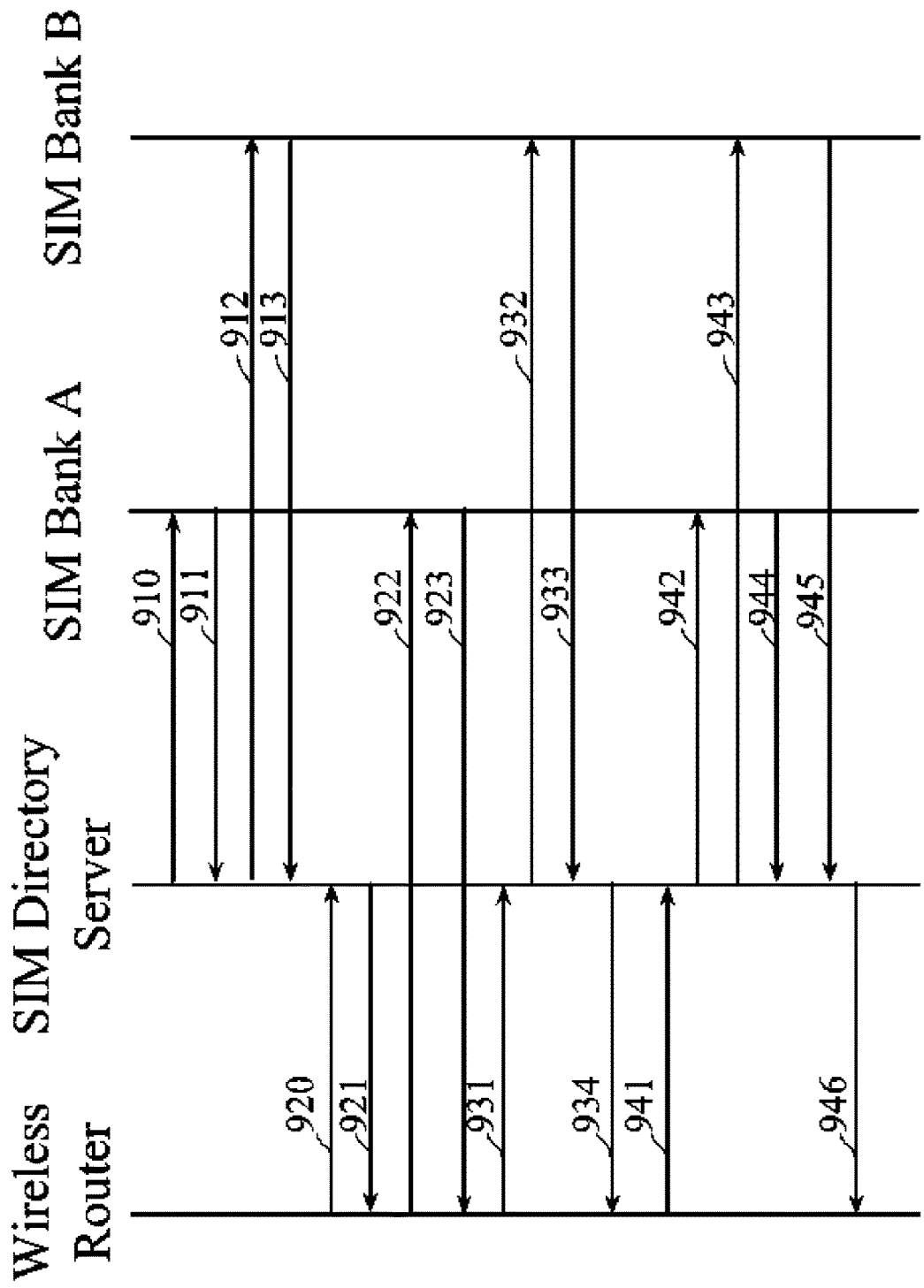
FIG. 9 illustrates sequences of a plurality of embodiments according to the present invention.

FIG. 8 illustrates a network diagram according to embodiments of the present invention. Cellular router 800 may be similar to cellular router 300 or cellular router 330. In one variant, cellular router 800 may not have remote data port. Cellular router 800 has a plurality of wireless communications modules to allow cellular router 800 to communicate to SIM directory server 804 and SIM banks 805 through interconnected network 803. Interconnected network may be the Internet or a combination of public and private networks. Each wireless communication module is coupled to one or more antennae and is capable to communicate with a wireless communication network, such as a cellular network. There is no limitation on the number of wireless communication modules. SIM bank 805 may be communication apparatus 320, such that SIM bank 805 has the hardware components illustrated in FIG. 3B FIG. 9 illustrates sequences of a plurality of embodiments according to the present invention. FIG. 9 should be viewed in conjunction with FIG. 8. For readability, SIM banks 805a and 805b are SIM bank A and SIM bank B respectively. At steps 910 and 912, SIM directory server 804 communicates with SIM bank A and SIM bank B respectively. There is no limitation on the number of SIM banks that SIM directory server 804 may communicate. For example, SIM directory server 804 may communicate with one SIM bank or twenty SIM banks. There is also no limitation that all the SIM banks must be communicated with simultaneously. For example, SIM directory server 804 may communicate with SIM bank B first and then with SIM bank B first one minute later. The SIM card availability information is then sent to SIM directory server 804 at steps 911 and 913 from SIM bank A and SIM bank B respectively. A more detailed description of steps 910-913 will be provided hereafter with respect to FIG. 3 below.

It is possible that after SIM directory server 804 communicated a SIM bank, a SIM card in the SIM bank may be used by a cellular router or reserved by another SIM directory server. As a result, SIM directory server may communicate with SIM bank A and SIM bank B periodically in order to retrieve updated SIM card availability information. In one variant, where there is a change in SIM card availability information, the corresponding SIM bank may communicate with SIM directory server 804 proactively.

It is preferred that SIM directory server 804 has updated information of SIM card information in SIM bank A and SIM bank B. This allows SIM directory server 804 to be able to identify a SIM card that is suitable or optimally suitable to a cellular router, such as cellular router 800, when a request of using a SIM card is received from cellular router 800 at step 920. At step 921, SIM directory server 804 selects a SIM card from one of SIM bank A and SIM bank B. SIM directory server 804 replies with SIM card connectivity information that allows cellular router 800 to communicate with a SIM card in one of SIM bank A and SIM bank B. A more detailed description of steps 920-921 will be provided hereafter with respect to FIG. 11 below.

For illustration purpose only, SIM bank A holds the selected SIM card. Cellular router 800 sends one or more requests to SIM bank A for communicating with the selected SIM in step 922. In a more detailed description, the one or more requests are encapsulated in a datagram, which is then encapsulated in a network frame or packet, such as an Internet Protocol (IP) packet. When SIM bank A receives the requests through one of its network interfaces, such as network interface 317, a processing unit of SIM bank A, such as processing unit 312, will process the requests and extract the SIM card request originated from a cellular modem of cellular router 800. The processing unit will then relay the extracted SIM card request to the selected SIM card. When the selected SIM card receives the extracted SIM card request, the selected SIM card may respond with a valid response. The selected SIM card may also respond with an error message or reject the request. The processing unit will then relay the response, error message, or rejection to the network interface. The network interface then sends the response, error message, or rejection to cellular router 800 through a network in step 923. It is preferred to encapsulate the response, error message, or rejection in a datagram, which is then encapsulated in a network frame or packet, such as an IP packet.

The processing unit of cellular router 800 may decapsulate the response, error message or rejection from the network frame or packet and then forward the response, error message or rejection to the cellular modem. The cellular modem in cellular router 800 may then use the response accordingly. For example, the cellular modem may perform authentication with a cellular network based on the response. In another example, the cellular modem may send and receive wireless data based on the response. As communications between the cellular modem and the selected SIM card are encapsulated in network frames and packets, cellular modem and the selected SIM card may communicate even over a network.

In another embodiment, cellular router 800 does not directly communicate with a SIM bank. SIM directory server 804 relays messages, requests, responses, error messages and rejections between a SIM bank and cellular router 800. For example, in step 931, cellular router 800 sends a request to SIM directory server 804, then SIM directory server 804 forwards the request to the SIM bank holding the selected SIM card. For illustration purpose only, SIM bank B holds the selected SIM card. Therefore, SIM directory server 804 in step 932 forwards the request to SIM bank B. When the selected SIM card replies with a response, an error message or a rejection, the reply is forwarded by SIM bank B to SIM directory server 804 in step 933. Then SIM directory server 804 forwards or relays the reply to cellular router 800 in step 934. Comparing to the embodiment illustrated in steps 920-923, the benefits of the present embodiments of using SIM directory server 804 for relaying includes higher security and simpler management. However, the disadvantages include larger latency.

In another embodiment, cellular router 800 does not directly communicate with a SIM bank. Further SIM directory server 804 may not know which SIM card is available when a request is received from cellular router 800 in step 941. The request may comprise a SIM card request. In steps 942 and 943, SIM directory server 804 requests for SIM card availability and forwards a plurality of requests, which are based on the request received in step 941, to SIM bank A and SIM bank B respectively at about the same time. One of the benefits for sending the plurality of requests to both SIM bank A and SIM bank B at about the same time is to reduce waiting time in case one of the requests was not received successfully by the corresponding SIM bank or one the SIM banks is not operating orderly. One of the disadvantages for sending the plurality of requests to both SIM bank A and SIM bank B at about the same time is consuming more resources. In step 944, SIM bank A sends a response in response to request received in step 942. Similarly, in step 945, SIM bank A sends a response in response to request received in step 943. When both responses in steps 944 and 945 provide SIM card availability information, SIM directory server 804 may select one of SIM card availability information to forward to cellular router 800. Therefore, only one SIM card is being selected and to be used by cellular router 800. For example, SIM directory server 804 selects SIM card availability information embedded in the response received in step 944 from SIM bank A, SIM directory server 804 forwards the SIM card availability information in step 946 to cellular router 800.

Regarding the SIM card availability information received in step 945 from SIM bank B, processing unit of SIM directory server 804 may not use it further or use it later for cellular router 800 or another cellular router.

Figure 10:
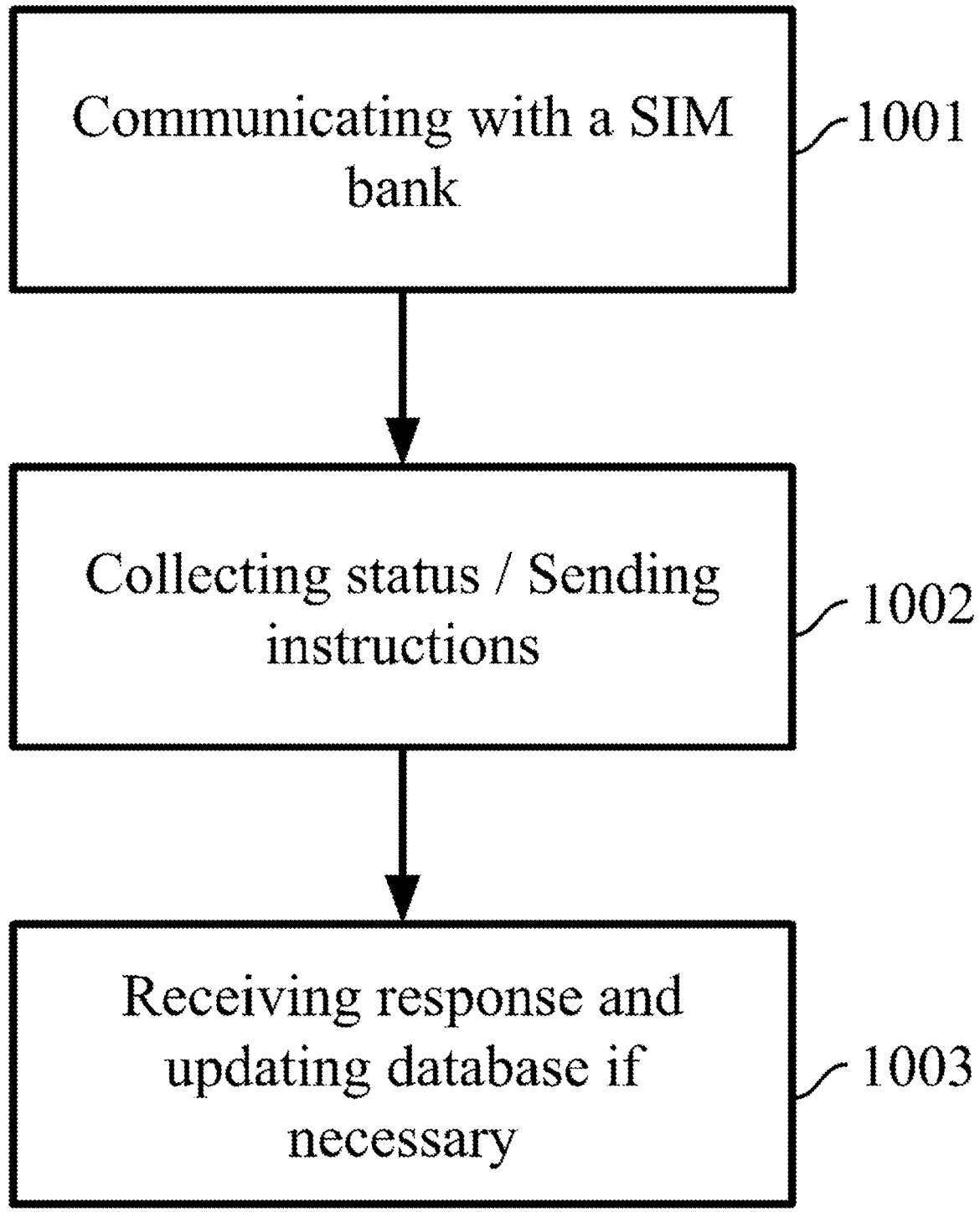
FIG. 10 illustrates a more detailed process of certain steps illustrated in FIG. 9.

FIG. 10 illustrates a more detailed process of steps 910-911 and steps 912-913. In process 1001, SIM directory server 804 selects a SIM bank to communicate with. There are myriads of ways to select the SIM bank. For example, SIM directory server 804 may select a SIM bank based on the period of time of last communication. In another example, SIM directory server 804 may select the SIM bank periodically. In another example, SIM directory server 804 may select the SIM bank after receiving a request to connect or connection termination from a cellular router. In process 1002, SIM directory server 804 sends messages to the selected SIM bank for collecting status and/or for instructing the selected SIM bank. For illustration purpose, the selected SIM bank is SIM bank B. In one example, SIM directory server 804 may collect SIM card availability information. SIM card availability information may include: number of SIM cards available for use, number of SIM cards being used, status of one or more SIM cards, location of one or more SIM cards, address of one or more SIM cards, position of one or more SIM cards and billing information of one or more SIM cards. In one example, SIM directory server 804 may collect information regarding a connection established using one of the SIM cards in SIM bank B with a cellular router. In one example, SIM directory server 804 may instruct SIM bank B to perform management on one or more SIM cards, including checking health of a SIM card; to disconnect a connection established between a cellular router with a SIM card; to reset a SIM card electronically; to reset a SIM card mechanically. Processes 1001 and 1002 may be performed together using one message or in sequence. At process 1003, SIM directory server 804 may receive a response from SIM bank B. The response may contain status of SIM bank B, status of one or more SIM cards in SIM bank B, execution results according to the instruction, error message and one or more messages received from one or more SIM cards in SIM bank B. Based on the response, processing unit(s) of SIM directory server 804 may update a database, further instruction SIM bank B, send one or more messages to one or more cellular routers. There is no limitation that SIM bank B must send a response to SIM directory server 804. For example, SIM bank B may be out of order and is not able to send a response. In another example, processing unit of SIM bank B may determine, according to instructions stored in non-transitory computer readable storage media, not to send a response.

The database being updated in step 1003 may perform as a directory for looking up a suitable SIM card. When cellular router 800 sends the request at step 200, cellular router 800 may not know which SIM card it should use. Through the database, processing unit of SIM directory server 804 is able to identify an available SIM card for cellular router 800. More details of the database will be described in process 1112.

Figure 11:
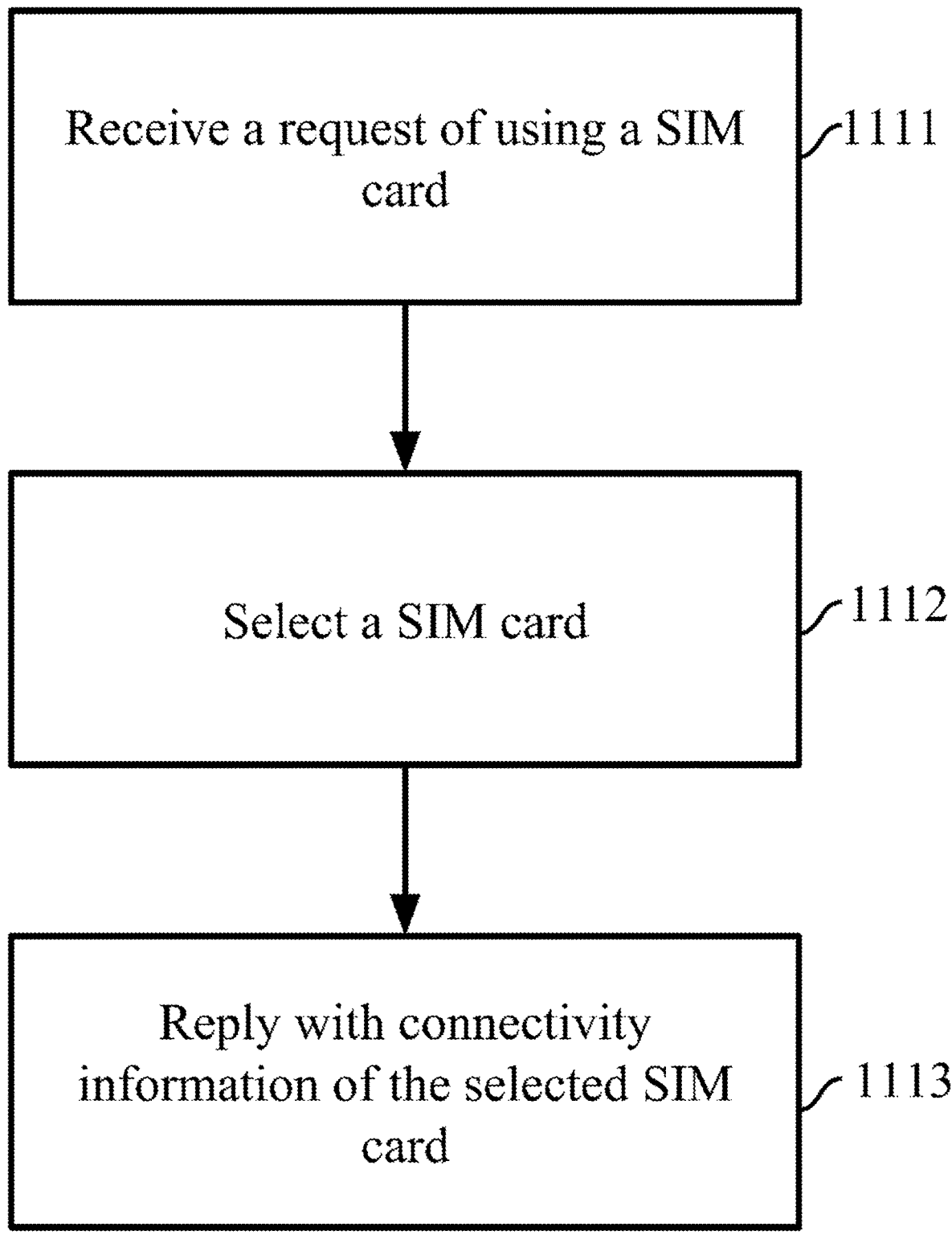
FIG. 11 illustrates a more detailed process of certain steps illustrated in FIG. 9.

FIG. 11 illustrates a more detailed process of steps 920-921. At process 1111, a request of using a SIM card from cellular router 800 is received by SIM directory server 804. When cellular router 800 first needs a SIM card for establishing a wireless communication with a wireless network service provider, cellular router 800 sends a request to SIM directory server 804. At this point, the processing unit of cellular router 800 has no information of which particular SIM card to use. The processing unit of cellular router 800 may embed preferences of a SIM card in the request. The processing unit of cellular router 800 may further embed other information, including location of cellular router 800 and other SIM cards that are being used by cellular router 800, in the request. The request may be encrypted.

In one variant, processing unit of cellular router 800 may send a plurality of the same request to SIM directory server 804 in order to increase the reliability that the request is received by SIM directory server 804. There is no limitation on the communications technology or media to be sued by sending the request. For example, cellular router 800 may send the plurality of the same request through a DSL communication service, a 4G/LTE communication service and an IEEE 802.11 wireless network. Processing unit of SIM directory server 804 may process the first arrived request of the plurality of the same request and ignore subsequent arrived requests of the plurality of the same request.

At process 1112, processing unit of SIM directory server 804 selects a SIM card for cellular router 800. The selection may be based on location of cellular router 800, wireless communication service providers accessible by cellular router 800, tariffs, time, date, estimated reliability between cellular router 800 and a SIM bank, location of a SIM bank, and/or usage restriction. There is no limit where the selected SIM card has to located at unless there is a such selection criteria. For example, SIM directory server 804 may select a SIM card from one of SIM bank A and SIM bank B. When there are additional SIM banks available, SIM directory server 804 may use a SIM card from an additional SIM bank.

In more details, the database in SIM directory server 804 is used to select the SIM card. As the database has availability information of SIM cards located in SIM banks 805, processing unit of SIM directory server 804 may use the database to select a SIM card quickly when receiving a request from cellular router 800. In the database, information stored related to a SIM card may include phone number, IMSI, Mobile Country Code (MCC), a Mobile Network Code (MNC), location of the SIM card, identity of the SIM bank holding the SIM card, IP address of the SIM bank, IP address of the SIM socket with the SIM card, tariff, data plan limited, data usage, remaining allowed data usage, wireless technology allowed, payment contact, subscription codes, geographical area allowed to be used without incurring roaming charge, and any other information that may help selecting the SIM card.

For example, based on the location information of cellular router 800 in the request, SIM directory server 804 may select a SIM card that would not incur roaming charge in the location of cellular router 800.

It is preferred that one of substantial criteria is tariffs. In one example, a SIM card that has lowest tariff for cellular router 800 to use is selected. For example, cellular router 800 is operating in Los Angeles. SIM directory server 804 will select a SIM card that has lowest tariff in Los Angeles for cellular router 800. When cellular router moves from Los Angeles to Las Vegas, for example, another SIM card may be selected in order to achieve lowest tariff.

In another example, based on one or more cellular networks found by cellular router 800 and sent to SIM directory server 804, SIM directory server 804 may select a SIM card that has a MCC and a MNC matching one of the one or more cellular networks. In one variant, SIM directory server 804 may use different criteria to selects a SIM. For example, in addition to be based on the location of cellular router 800, SIM directory server 804 may select a SIM card based on not only the location of cellular router 800 but also the remaining allowed data usage of a SIM card.

Information of the selected SIM card may be retrieved from the database of the SIM bank which holds the selected SIM card. The information may also be already provided to SIM directory server 804 before the SIM card is selected. For example, the information may be stored in a database locally accessible to the SIM directory server 804. Once the SIM card is selected, SIM directory server 804 may retrieve the information from the database. The information may be used to facilitate the selection.

In one variant, after a SIM card is selected, SIM directory server 804 may verify whether the selected SIM card is indeed available for use. SIM directory server 804 may send a request to the SIM bank holding the selected SIM card for verification. In one example, the SIM bank will send a request to the SIM bank holding the selected SIM card is in operation. The SIM bank will then reply to the request of SIM directory server 804.

At process 1113, SIM directory server 804 reply to the request received at process 1111 with connectivity information. SIM card connectivity information may include identity of a SIM bank, identity of the selected SIM card, IMEI of the selected SIM card, a publicly reachable address of the SIM bank which holds the selected SIM card, a publicly reachable address of the selected SIM card, usage restriction, and/or authentication information. For example, IP address of the SIM banking holding the selected SIM card may be included in the SIM card connectivity information. In another example, a security token with a time limit is sent to both cellular router 800 and the SIM bank. Cellular router 800 will then have to authenticate with the SIM bank within the time limit using the security token.

There is no limitation on the medium and technology communications used for cellular router 800 to send the request of using a SIM card. For example, the request in process 1111 may be sent by cellular router 800 through an Internet connection or a private connection. The request may also be sent through a wireless connection or a wired connection. In one example, the request is sent through network interface 310 check of cellular router 800 using an ADSL connection. In another example, the request is sent through one of wireless communication modules 307 and the connectivity information embedded in reply in process 1113 is for another wireless communication module of wireless communication modules 307. For example, the wireless communication module is wireless communication module 307*a* and the another wireless communication module is wireless communication module 307*b*. Wireless communication module 307*a* is used to send the request may establish a connection based on a locally available SIM card in cellular router 800. The use of locally available SIM card may incur a roaming charge or higher tariff. Therefore, before the wireless communication module 307*b* can be used, the use of wireless communication module 307*a* is restricted. For example, wireless communication module 307*a* may only be used to communicate with SIM directory server 804 and SIM banks 805. In one variant, there is no restriction on the use of wireless communication module 307*a*.

In one embodiment, after one wireless communication module of wireless communication modules 307 has successfully established a connection to the Internet, cellular router 800 will repeat (i) steps 920 to 923, (ii) steps 931-934 or (iii) steps 941-946 for another wireless communication module. For example, after wireless communication module 307*a* has used SIM card connectivity information from SIM bank 805 to establish an Internet connection, processing unit of cellular router 800 may use wireless communication module 307*a* to perform steps 931-934 to retrieve SIM card connectivity information in order to enable wireless communication module 307*b* to connect to the Internet. The SIM card connectivity information for wireless communication module 307*b* is originated from a SIM card located in one of the SIM banks.

In one variant, a SIM bank may have one or more wireless communication modules. Processing unit of the SIM bank may use the one or more wireless communication modules to test a SIM card if the SIM card is operational. This avoids the situation that an out-of-order SIM card is being assigned to a cellular router by SIM directory server 804. In one variant, processing unit of the SIM bank may communicate with a SIM card for testing without using a wireless communication module. In one variant, a SIM directory server may issue a test instruction to a SIM bank to test a SIM card.

In one variant, a SIM director server may have one or more wireless communication modules. Processing unit of the SIM director server may use the one or more wireless communication modules to test a SIM card in a SIM bank if the SIM card is operational. This avoids the situation that an out-of-order SIM card is being assigned to a cellular router by SIM directory server 804. In one variant, processing unit of the SIM directory server may communicate with a SIM card for testing without using a wireless communication module.

Figure 12:
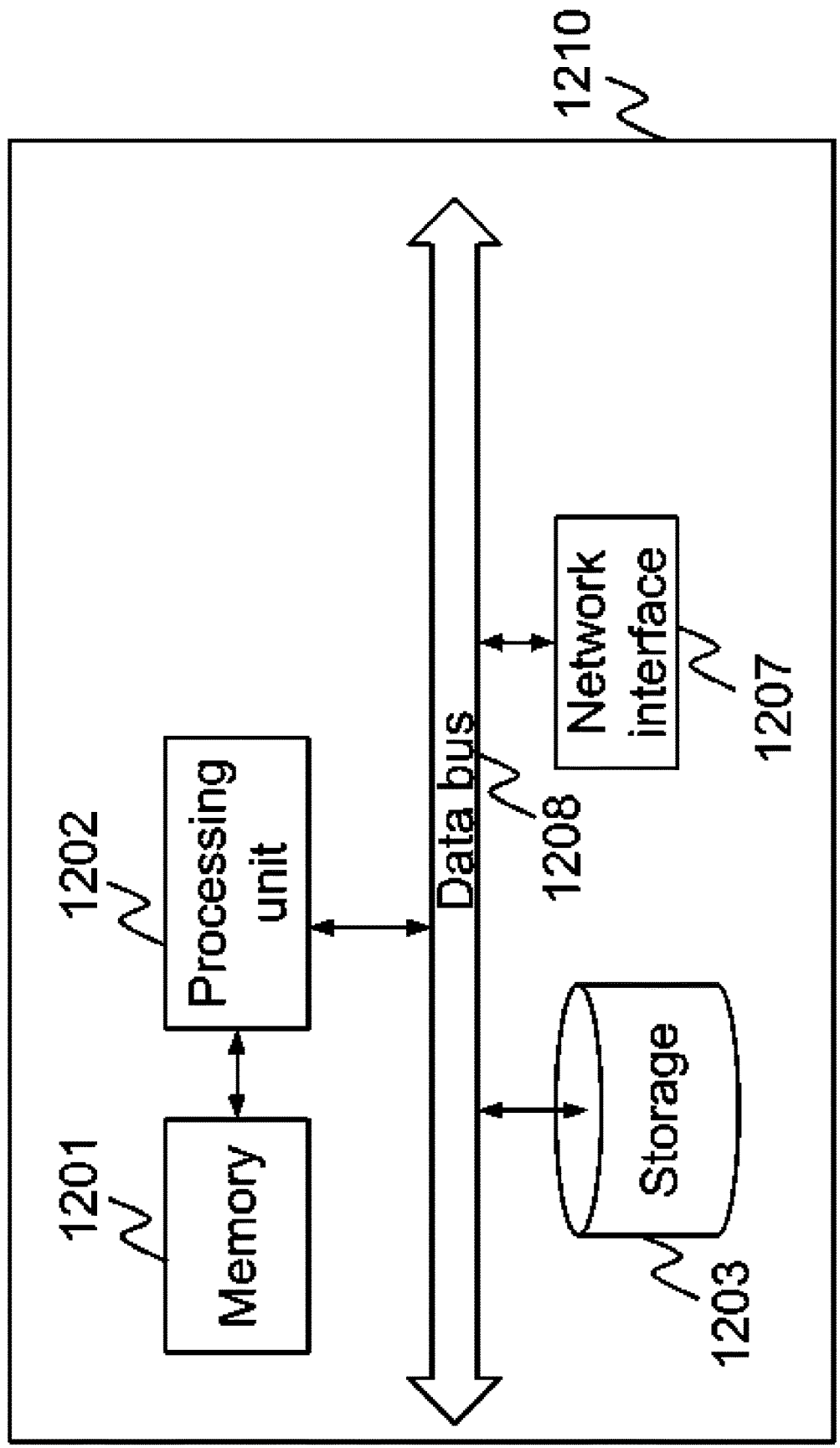
FIG. 12 illustrates a basic block diagram of an exemplary SIM directory server according to one of the embodiments of the present invention.

FIG. 12 illustrates a basic block diagram of an exemplary SIM directory server according to one of the embodiments of the present invention. SIM directory server 1210 comprises data bus 1208, memory 1201, processing unit 1202, storage unit 1203 and network interface 1207. Processing unit 1202 connects directly to memory 1201.

Processing unit 1202 executes program instructions or code segments for implementing embodiments of the SIM directory server of the present invention.

Figure 13:
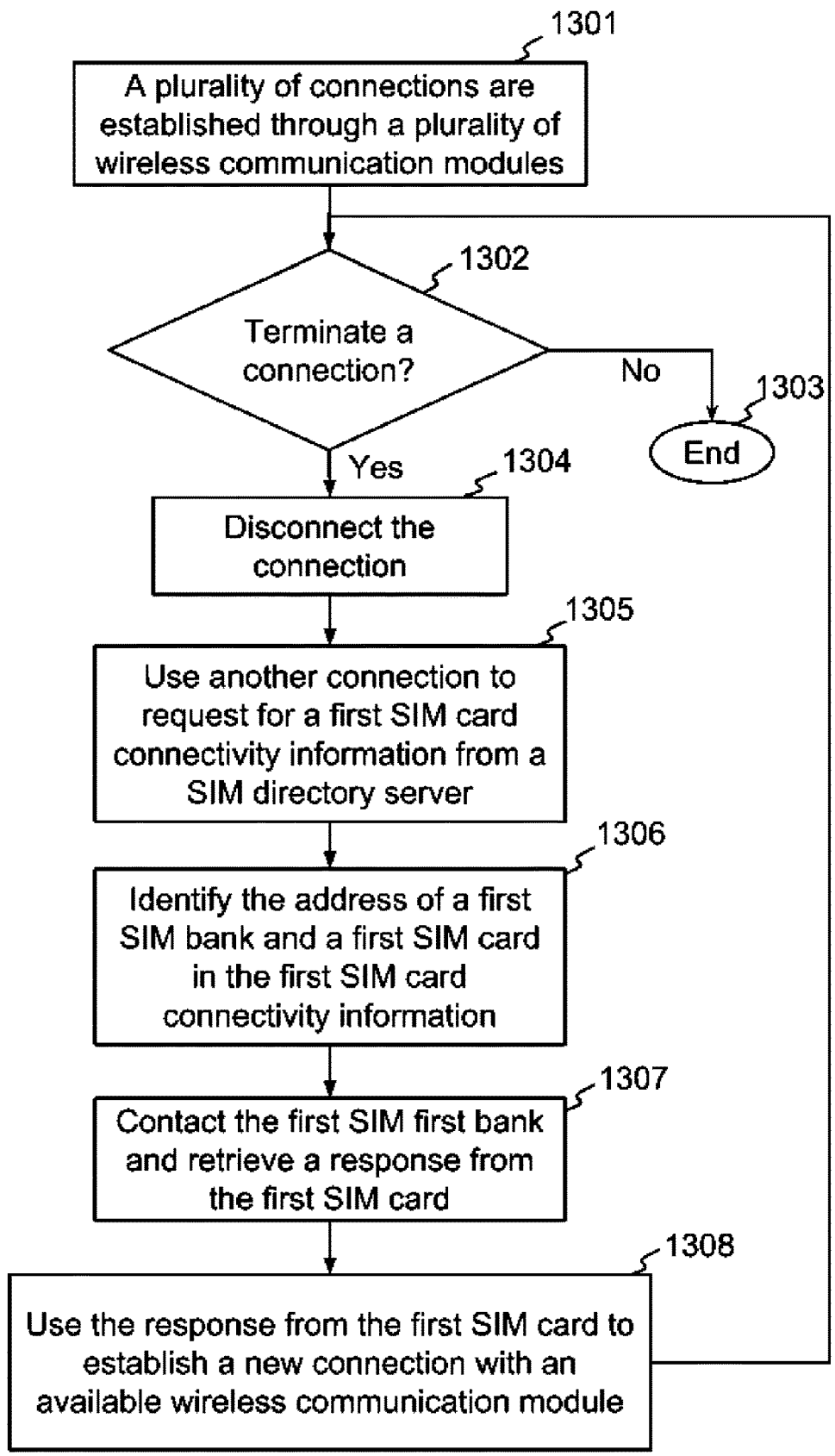
FIG. 13 illustrates a flowchart of processes being performed according to one of the embodiments of the present invention.

FIG. 13 illustrates a flow-chart of processes being performed according to one of the embodiments of the present invention. FIG. 13 should be viewed in conjunction with FIG. 8. When a cellular router is moving from one region to another region, roaming charge may be imposed for using a non-local SIM card. In such case tariff of using another SIM card from a SIM bank may be lowered than the SIM card that is being used. The SIM that is being used may be held in the cellular router or in a SIM bank.

At process 1301, a plurality of connections are established with the same or different wireless service providers using SIM card connectivity information originated from SIM cards held in one or more SIM banks. The plurality of connections may be established through a plurality of wireless communication module, such as wireless communication module 307a and wireless communication module 307b, respectively. There is also no limitation that the present invention is limited to two wireless communication modules. There may be five, ten, fifty, one hundred or even more wireless communication modules. There is also no limitation to the number of connections.

At process 1302, processing unit of cellular router 800 determines if one or more connections needs to be disconnected. One of the reasons to disconnect a connection' is tariff. Another reason is location of the cellular router 800. Another reason is reaching the maximum amount of data allowed in a period of time. Processing unit of cellular router 800 may also disconnect a connection based on an instruction received from a user, an administrator or a remote server. If there is no need to disconnect any established connection, the processes stop at process 1303. For illustration purpose only, processing unit of cellular router 800 determines that a connection established using wireless communication module 307a should be disconnected.

At process 1304, processing unit of cellular router 800 instructs wireless communication module 307a to disconnect the connection. After the disconnection, wireless communication module 307a may then be used to establish a new connection.

At process 1305, processing unit of cellular router 800 requests for SIM card availability information by sending a request through wireless communication module 307b and the second connection to SIM directory server 804. There is no limitation that only wireless communication module 307b is allowed to be used. When there are more connections, one or more of the connections may be used to send the request. For example, if there is a third wireless communication module has already established a connection or a connection established using an Ethernet cable through a network interface, the connection may be used.

At process 1306, processing unit of cellular router 800 receives a reply from SIM directory server 804. The reply may encapsulate a first SIM card connectivity information, which may include the address of a first SIM bank and a first SIM card selected by processing unit of SIM directory server 804. For illustration purpose, the first SIM card is located at SIM bank 805a.

At process 1307, processing unit of cellular router 800 contacts SIM bank 805a to retrieve a response from the first SIM card. Processing unit of cellular router 800 processes the response and instructs wireless communication module 307a to establishes a new connection at process 1308. Processing unit of cellular router 800 is then capable of using the new connection to communicate with other hosts and servers, including the Internet and email servers.

Therefore, after process 1308, the remaining plurality of connections and the new connection may be used for communications. In one example, connections may be aggregated together to form one aggregated connection. Processing unit of cellular router 800 may use the aggregated connection to communicate with SIM directory server 804 and to connect to other hosts and servers.

After process 1308, process 1302 will be repeated in order to determine if there are other connections should be disconnected. In one variant, this embodiment may end after process 1308 without going back to process 1302.

There is no limitation that MCU and interface circuits must be discrete components. If processing unit is capable of providing the functionalities of MCU and/or interface circuits, MCU and interface circuits may be omitted. For example, one processing unit may be used to realize MCU 314 and processing unit 312. In another example, if MCU 306 or MCU 314 is capable of communicating with a SIM card in SIM socket, interface circuits may be omitted. In another example, if processing unit is capable of communicating with a SIM card in SIM socket, MCU and interface circuits may be omitted.

In one embodiment, communications between a cellular router, such as cellular routers 330 and 801, and a SIM bank or a SIM directory server are carried out with redundancy in order to increase the reliability. For example, a plurality of same requests and/or responses may be sent. The first received request or response will be used for processing while other requests or responses will be discarded.

There is no limitation that the present invention is limited to cellular router 111. For example, cellular router may be replaced with an electronic device that provides networking functions to other devices or to itself only. The electronic device may send information to another electronic device through the Internet. For example, the electronic device may be a lightbulb with Internet connectivity and a communication device in a vehicle.

The invention claimed is:
1. A method of establishing a communication session between a subscriber identification module (SIM) card and a wireless communication module (WCM), wherein the SIM card is in a communication apparatus and the WCM is in a cellular router, the method comprising:
  at the communication apparatus:
    (a) sending an activation message to the SIM card;
    (b) receiving an answer to reset (ATR) from the SIM card;

(c) storing the ATR in a non-transitory storage medium of the communication apparatus; and
(d) when the activation message is received from the cellular router: retrieving the ATR from the non-transitory storage medium of the communication apparatus, and sending the ATR to the cellular router;

at the cellular router:
(e) when the ATR is received from a SIM bank, storing the ATR in a non-transitory storage medium of the cellular router;
(f) receiving a reset signal from the WCM;
(g) retrieving the ATR from the non-transitory storage medium of the cellular router, and sending the ATR to the WCM; and
(h) establishing the communication session between the SIM card and the WCM;

wherein the communication apparatus and the cellular router are connected through at least one connection.

2. The method of claim 1, wherein:
the activation message is sent to the SIM card at the communication apparatus via an interface integrated circuit (IC) through a SIM socket;
the ATR is received from the SIM card at the communication apparatus via the interface IC through the SIM socket; and
the SIM card is plugged into the SIM socket.

3. The method of claim 1, wherein:
the reset signal is received from the WCM at the cellular router via an interface circuit; and
the ATR is sent to the WCM at the cellular router via the interface circuit.

4. The method of claim 3, wherein the interface circuit comprises a voltage shifter to receive the reset signal from the WCM and to send the ATR to the WCM.

5. The method of claim 1, further comprising:
at the communication apparatus:
before the activation message is sent to the SIM card, receiving the activation message from the cellular router.

6. The method of claim 5, wherein:
the activation message includes an identification of the SIM card received from the cellular router; and
the SIM card is identified at the communication apparatus according to the identification of the SIM.

7. The method of claim 6, wherein the activation message and the identification of the SIM card are encapsulated in a request message received from the cellular router.

8. The method of claim 1, further comprising:
at the cellular router:
when the reset signal is received from the WCM, storing an identification of the WCM in the non-transitory storage medium of the cellular router.

9. The method of claim 8, wherein:
the reset signal includes the identification of the WCM sent by the cellular router to the communication apparatus; and
the ATR is sent to the WCM at the cellular router according to the identification of the WCM.

10. The method of claim 8, wherein the ATR and the identification of the WCM are encapsulated in a reply message sent by the communication apparatus to the cellular router.

11. A system of establishing a communication session between a subscriber identification module (SIM) card and a wireless communication module (WCM), the system comprising:
a communication apparatus; and
a cellular router;
wherein the communication apparatus comprises:
at least one first processing unit;
at least one first non-transitory storage medium; and
a plurality of SIM cards; the SIM card is in the plurality of SIM cards;
wherein the cellular router comprises:
at least one second processing unit;
at least one second non-transitory storage medium; and
a plurality of WCMs; the WCM is in the plurality of WCMs;
wherein the at least one first non-transitory storage medium stores program instructions executable by the at least one first processing unit for:
(a) sending an activation message to the SIM card;
(b) receiving an answer to reset (ATR) from the SIM card;
(c) storing the ATR in the at least one first non-transitory storage medium; and
(d) when the activation message is received from the cellular router: retrieving the ATR from the at least one first non-transitory storage medium, and sending the ATR to the cellular router;
wherein the at least one second non-transitory storage medium stores program instructions executable by the at least one second processing unit for:
(e) when the ATR is received from a SIM bank, storing the ATR in the at least one second non-transitory storage medium;
(f) receiving a reset signal from the WCM;
(g) retrieving the ATR from the at least one second non-transitory storage medium, and sending the ATR to the WCM; and
(h) establishing the communication session between the SIM card and the WCM;
wherein the communication apparatus and the cellular router are connected through at least one connection.

12. The system of claim 11, wherein:
the activation message is sent to the SIM card at the communication apparatus via an interface integrated circuit (IC) through a SIM socket;
the ATR is received from the SIM card at the communication apparatus via the interface IC through the SIM socket; and
the SIM card is plugged into the SIM socket.

13. The system of claim 11, wherein:
the reset signal is received from the WCM at the cellular router via an interface circuit; and
the ATR is sent to the WCM at the cellular router via the interface circuit.

14. The system of claim 13, wherein the interface circuit comprises a voltage shifter to receive the reset signal from the WCM and to send the ATR to the WCM.

15. The system of claim 11, wherein the at least one first non-transitory storage medium further stores program instructions executable by the at least one first processing unit for:
before the activation message is sent to the SIM card, receiving the activation message from the cellular router.

16. The system of claim 15, wherein:
the activation message includes an identification of the SIM card received from the cellular router; and
the SIM card is identified at the communication apparatus according to the identification of the SIM.

17. The system of claim 16, wherein the activation message and the identification of the SIM card are encapsulated in a request message received by the communication apparatus from the cellular router.

18. The system of claim 11, wherein the at least one second non-transitory storage medium further stores program instructions executable by the at least one second processing unit for:
   when the reset signal is received from the WCM, storing an identification of the WCM in the at least one second non-transitory storage medium.

19. The system of claim 18, wherein:
   the reset signal includes the identification of the WCM sent by the cellular router to the communication apparatus; and
   the ATR is sent to the WCM at the cellular router according to the identification of the WCM.

20. The system of claim 18, wherein the ATR and the identification of the WCM are encapsulated in a reply message sent by the communication apparatus to the cellular router.

* * * * *